United States Patent
McMillen et al.

(10) Patent No.: US 9,827,996 B2
(45) Date of Patent: Nov. 28, 2017

(54) SENSOR SYSTEMS INTEGRATED WITH STEERING WHEELS

(71) Applicant: BeBop Sensors, Inc., Berkeley, CA (US)

(72) Inventors: Keith A. McMillen, Berkeley, CA (US); Conner Lacy, Charlottesville, VA (US); Brent Allen, Ross, CA (US); Kyle Lobedan, Oakland, CA (US); Gregory Wille, Berkeley, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 0 days.

(21) Appl. No.: 15/190,089

(22) Filed: Jun. 22, 2016

(65) Prior Publication Data

US 2016/0375910 A1    Dec. 29, 2016

Related U.S. Application Data

(60) Provisional application No. 62/184,577, filed on Jun. 25, 2015.

(51) Int. Cl.

| | |
|---|---|
| *B60W 50/08* | (2012.01) |
| *B60W 50/00* | (2006.01) |
| *G01L 1/18* | (2006.01) |
| *B62D 1/06* | (2006.01) |
| *B60W 40/09* | (2012.01) |
| *B62D 1/04* | (2006.01) |

(52) U.S. Cl.
CPC ........ *B60W 50/0098* (2013.01); *B60W 40/09* (2013.01); *B62D 1/046* (2013.01); *B62D 1/06* (2013.01); *G01L 1/18* (2013.01)

(58) Field of Classification Search
CPC combination set(s) only.
See application file for complete search history.

(56) References Cited

U.S. PATENT DOCUMENTS

| | | |
|---|---|---|
| 4,294,014 A | 10/1981 | Baumann et al. |
| 4,438,291 A | 3/1984 | Eichelberger et al. |
| 4,693,530 A | 9/1987 | Stillie et al. |
| 4,790,968 A | 12/1988 | Ohkawa et al. |
| 4,852,443 A | 8/1989 | Duncan et al. |
| 5,033,291 A | 7/1991 | Podoloff et al. |
| 5,128,880 A | 7/1992 | White |

(Continued)

FOREIGN PATENT DOCUMENTS

| | | |
|---|---|---|
| CN | 201920728 U | 8/2011 |
| CN | 102551728 A | 7/2012 |

(Continued)

OTHER PUBLICATIONS

U.S. Office Action dated Sep. 12, 2012 issued in U.S. Appl. No. 12/904,657.

(Continued)

*Primary Examiner* — Edward J Pipala
(74) *Attorney, Agent, or Firm* — Weaver Austin Villeneuve & Sampson LLP

(57) ABSTRACT

Steering wheel sensor systems are described in which a sensor array is attached to or integrated with a steering wheel and provides information about the forces exerted on the steering wheel for interacting with or controlling other vehicle systems.

33 Claims, 10 Drawing Sheets

(56) References Cited

U.S. PATENT DOCUMENTS

| | | |
|---|---|---|
| 5,131,306 A | 7/1992 | Yamamoto |
| 5,219,292 A | 6/1993 | Dickirson et al. |
| 5,237,520 A | 8/1993 | White |
| 5,288,938 A | 2/1994 | Wheaton |
| 5,316,017 A | 5/1994 | Edwards et al. |
| 5,429,092 A | 7/1995 | Kamei |
| 5,571,973 A | 11/1996 | Taylot |
| 5,578,766 A | 11/1996 | Kondo |
| 5,659,395 A | 8/1997 | Brown et al. |
| 5,695,859 A | 12/1997 | Burgess |
| 5,729,905 A | 3/1998 | Mathiasmeier et al. |
| 5,822,223 A | 10/1998 | Genest |
| 5,866,829 A | 2/1999 | Pecoraro |
| 5,878,359 A | 3/1999 | Takeda |
| 5,943,044 A | 8/1999 | Martinelli et al. |
| 5,989,700 A | 11/1999 | Krivopal |
| 6,029,358 A | 2/2000 | Mathiasmeier et al. |
| 6,032,109 A * | 2/2000 | Ritmiller, III ......... G01D 3/022 702/104 |
| 6,049,327 A | 4/2000 | Walker et al. |
| 6,141,643 A | 10/2000 | Harmon |
| 6,155,120 A | 12/2000 | Taylor |
| 6,215,055 B1 | 4/2001 | Saravis |
| 6,216,545 B1 | 4/2001 | Taylor |
| 6,304,840 B1 | 10/2001 | Vance et al. |
| 6,331,893 B1 | 12/2001 | Brown et al. |
| 6,360,615 B1 | 3/2002 | Smela |
| 6,486,776 B1 | 11/2002 | Pollack et al. |
| 6,763,320 B2 | 7/2004 | Kimble |
| 6,815,602 B2 | 11/2004 | De Franco |
| 6,822,635 B2 | 11/2004 | Shahoian et al. |
| 6,829,942 B2 | 12/2004 | Yanai et al. |
| 6,964,205 B2 | 11/2005 | Papakostas et al. |
| 7,066,887 B2 | 6/2006 | Flesch et al. |
| 7,109,068 B2 | 9/2006 | Akram et al. |
| 7,113,856 B2 | 9/2006 | Theiss et al. |
| 7,157,640 B2 | 1/2007 | Baggs |
| 7,302,866 B1 | 12/2007 | Malkin et al. |
| 7,332,670 B2 | 2/2008 | Fujiwara et al. |
| 7,409,256 B2 | 8/2008 | Lin et al. |
| 7,493,230 B2 | 2/2009 | Schwartz et al. |
| 7,536,794 B2 | 5/2009 | Hay et al. |
| 7,608,776 B2 | 10/2009 | Ludwig |
| 7,719,007 B2 | 5/2010 | Tompkins et al. |
| 7,754,956 B2 | 7/2010 | Gain et al. |
| 7,780,541 B2 | 8/2010 | Bauer |
| 7,855,718 B2 | 12/2010 | Westerman |
| 7,928,312 B2 | 4/2011 | Sharma |
| 7,984,544 B2 | 7/2011 | Rosenberg |
| 8,117,922 B2 | 2/2012 | Xia et al. |
| 8,161,826 B1 | 4/2012 | Taylor |
| 8,274,485 B2 | 9/2012 | Liu et al. |
| 8,346,684 B2 | 1/2013 | Mirbach et al. |
| 8,368,505 B2 | 2/2013 | Deppiesse et al. |
| 8,448,530 B2 | 5/2013 | Leuenberger et al. |
| 8,479,585 B2 | 7/2013 | Shaw-Klein |
| 8,536,880 B2 | 9/2013 | Philipp |
| 8,571,827 B2 | 10/2013 | Jang et al. |
| 8,680,390 B2 | 3/2014 | McMillen et al. |
| 8,884,913 B2 | 11/2014 | Saynac et al. |
| 8,904,876 B2 | 12/2014 | Taylor et al. |
| 8,925,393 B2 | 1/2015 | Cannard et al. |
| 8,945,328 B2 | 2/2015 | Longinotti-Buitoni et al. |
| 8,947,889 B2 | 2/2015 | Kelley et al. |
| 8,964,205 B2 | 2/2015 | Shimizu |
| 8,970,513 B2 | 3/2015 | Kwon et al. |
| 9,038,482 B2 | 5/2015 | Xia et al. |
| 9,075,404 B2 | 7/2015 | McMillen et al. |
| 9,076,419 B2 | 7/2015 | McMillen et al. |
| 9,112,058 B2 | 8/2015 | Bao et al. |
| 9,164,586 B2 | 10/2015 | Zellers et al. |
| 9,271,665 B2 | 3/2016 | Sarrafzadeh et al. |
| 9,417,693 B2 | 8/2016 | Seth |
| 9,442,614 B2 | 9/2016 | McMillen |
| 9,480,582 B2 | 11/2016 | Lundborg |
| 9,529,433 B2 | 12/2016 | Shankar et al. |
| 9,546,921 B2 | 1/2017 | McMillen et al. |
| 9,652,101 B2 | 5/2017 | McMillen et al. |
| 9,696,833 B2 | 7/2017 | McMillen |
| 9,710,060 B2 | 7/2017 | McMillen et al. |
| 2002/0078757 A1 | 6/2002 | Hines et al. |
| 2004/0031180 A1 | 2/2004 | Ivanov |
| 2004/0093746 A1 | 5/2004 | Varsallona |
| 2004/0183648 A1 | 9/2004 | Weber et al. |
| 2004/0189145 A1 | 9/2004 | Pletner et al. |
| 2005/0109095 A1 | 5/2005 | Sinnett |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo de Moraes |
| 2008/0069412 A1 * | 3/2008 | Champagne ....... G06K 9/00013 382/124 |
| 2008/0158145 A1 | 7/2008 | Westerman |
| 2008/0189827 A1 | 8/2008 | Bauer |
| 2008/0254824 A1 | 10/2008 | Moraes |
| 2009/0049980 A1 | 2/2009 | Sharma |
| 2009/0237374 A1 | 9/2009 | Li et al. |
| 2009/0272197 A1 | 11/2009 | Ridao Granado et al. |
| 2009/0301190 A1 | 12/2009 | Ross, Jr. et al. |
| 2009/0303400 A1 | 12/2009 | Hou et al. |
| 2010/0134327 A1 | 6/2010 | Dinh et al. |
| 2010/0149108 A1 | 6/2010 | Hotelling et al. |
| 2010/0179724 A1 | 7/2010 | Weston |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2012/0007831 A1 | 1/2012 | Chang et al. |
| 2012/0024132 A1 | 2/2012 | Wallace et al. |
| 2012/0026124 A1 | 2/2012 | Li et al. |
| 2012/0055257 A1 | 3/2012 | Shaw-Klein |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0234105 A1 | 9/2012 | Taylor |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0165809 A1 | 6/2013 | Abir |
| 2013/0192071 A1 | 8/2013 | Esposito et al. |
| 2013/0211208 A1 | 8/2013 | Varadan et al. |
| 2013/0239787 A1 | 9/2013 | McMillen et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0090488 A1 | 4/2014 | Taylor et al. |
| 2014/0104776 A1 | 4/2014 | Clayton et al. |
| 2014/0107966 A1 | 4/2014 | Xia et al. |
| 2014/0107967 A1 | 4/2014 | Xia et al. |
| 2014/0107968 A1 | 4/2014 | Xia et al. |

(56) References Cited

U.S. PATENT DOCUMENTS

| | | |
|---|---|---|
| 2014/0125124 A1 | 5/2014 | Verner |
| 2014/0130593 A1 | 5/2014 | Ciou et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222243 A1 | 8/2014 | McMillen et al. |
| 2014/0318699 A1 | 10/2014 | Longinotti-Buitoni et al. |
| 2014/0347076 A1 | 11/2014 | Barton et al. |
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0261372 A1 | 9/2015 | McMillen et al. |
| 2015/0316434 A1 | 11/2015 | McMillen et al. |
| 2015/0317964 A1 | 11/2015 | McMillen et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1 | 11/2015 | McMillen et al. |
| 2015/0331533 A1 | 11/2015 | McMillen et al. |
| 2015/0370396 A1 | 12/2015 | Hotelling et al. |
| 2016/0054798 A1 | 2/2016 | Messingher et al. |
| 2016/0070347 A1 | 3/2016 | McMillen et al. |
| 2016/0169754 A1 | 6/2016 | Kowalewski et al. |
| 2016/0175186 A1 | 6/2016 | Shadduck |
| 2016/0238547 A1 | 8/2016 | Park et al. |
| 2016/0252412 A1 | 9/2016 | McMillen et al. |
| 2016/0270727 A1 | 9/2016 | Berg et al. |
| 2016/0278709 A1 | 9/2016 | Ridao Granado et al. |
| 2016/0318356 A1 | 11/2016 | McMillen et al. |
| 2017/0038881 A1 | 2/2017 | McMillen |
| 2017/0110103 A1 | 4/2017 | McMillen et al. |
| 2017/0167931 A1 | 6/2017 | McMillen et al. |

FOREIGN PATENT DOCUMENTS

| | | |
|---|---|---|
| CN | 202396601 U | 8/2012 |
| CN | 203234132 U | 10/2013 |
| CN | 102406280 B | 3/2014 |
| DE | 11 2010 004 038 T5 | 9/2012 |
| EP | 0 014 022 B1 | 11/1984 |
| EP | 2 682 724 A1 | 1/2014 |
| JP | H08-194481 A | 7/1996 |
| JP | 2000-267664 A | 9/2000 |
| JP | 2008-515008 A | 5/2008 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| RU | 2 533 539 C1 | 11/2014 |
| WO | WO 99/20179 A1 | 4/1999 |
| WO | WO 2007/024875 A2 | 3/2007 |
| WO | CN 200980381 Y | 11/2007 |
| WO | WO 2009/155891 A1 | 12/2009 |
| WO | WO 2011/047171 A2 | 4/2011 |
| WO | WO 2015/175317 A1 | 11/2015 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |

OTHER PUBLICATIONS

U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Notice of Allowance dated May 1, 2015 issued in U.S. Appl. No. 14/173,617.
U.S. Office Action dated Mar. 10, 2016 issued in U.S. Appl. No. 14/727,619.
U.S. Final Office Action dated Jul. 18, 2016 issued in U.S. Appl. No. 14/727,619.
U.S. Notice of Allowance dated Sep. 15, 2016 issued in U.S. Appl. No. 14/727,619.
U.S. Office Action dated Apr. 2, 2015 issued in U.S. Appl. No. 13/799,304.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Final Office Action dated Mar. 9, 2016 issued in U.S. Appl. No. 14/728,872.
U.S. Office Action dated Jun. 22, 2016 issued in U.S. Appl. No. 14/728,872.
U.S. Final Office Action dated Oct. 18, 2016 issued in U.S. Appl. No. 14/728,872.
U.S. Advisory Action dated Feb. 10, 2017 issued in U.S. Appl. No. 14/728,872.
U.S. Office Action dated May 19, 2017 issued in U.S. Appl. No. 14/728,872.
U.S. Office Action dated Jul. 25, 2016 issued in U.S. Appl. No. 14/728,873.
U.S. Office Action dated Dec. 30, 2016 issued in U.S. Appl. No. 14/728,873.
U.S. Final Office Action dated Mar. 31, 2017 issued in U.S. Appl. No. 14/728,873.
U.S. Advisory Action and Examiner initiated interview summary dated May 26, 2017 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Final Office Action dated Apr. 19, 2017 issued in U.S. Appl. No. 14/299,976.
U.S. Final Office Action dated Jun. 8, 2017 issued in U.S. Appl. No. 14/299,976.
U.S. Office Action dated Jan. 13, 2016 issued in U.S. Appl. No. 14/464,551.
U.S. Notice of Allowance dated Jun. 23, 2016 issued in U.S. Appl. No. 14/464,551.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S. Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.

(56) References Cited

OTHER PUBLICATIONS

U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Sep. 15, 2016 issued in PCT/US2016/029528.
PCT International Search Report and Written Opinion dated Sep. 29, 2016 issued in PCT/US2016/039089.
PCT International Search Report and Written Opinion dated Jan. 19, 2017 issued in PCT/US2016/055997.
"Electronic Foot Size Measuring Devices," *Sensatech Research LTD., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (©2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.
"The Emed®-Systems," [retrieved at http://www.novel.de/novelcontent/emed on Sep. 17, 2015] *novel.de*, 4 pages.
U.S. Appl. No. 15/479,103, filed Apr. 4, 2017, McMillen et al.
U.S. Appl. No. 15/483,926, filed Apr. 10, 2017, McMillen.
U.S. Appl. No. 15/621,935, filed Jun. 13, 2017, McMillen et al.
U.S. Appl. No. 15/630,840, filed Jun. 22, 2017, McMillen et al.

\* cited by examiner

SENSOR SYSTEMS INTEGRATED WITH STEERING WHEELS

RELATED APPLICATION DATA

The present application is a non-provisional and claims priority under 35 U.S.C. 119(e) to U.S. Provisional Patent Application No. 62/184,577 entitled Sensor Systems Integrated With Steering Wheels filed on Jun. 25, 2015, the entire disclosure of which is incorporated herein by reference for all purposes.

BACKGROUND

Demand is rapidly rising for technologies that bridge the gap between computing devices and the physical world. These interfaces typically require some form of sensor technology that translates information from the physical domain to the digital domain. The "Internet of Things" contemplates the use of sensors in a virtually limitless range of applications, for many of which conventional sensor technology is not well suited.

SUMMARY

Steering wheel sensor systems are described herein. According to a particular class of implementations, a sensor system includes a flexible dielectric substrate, flexible piezoresistive material in contact with the flexible dielectric substrate, and an array of sensors. Each sensor includes at least two conductive traces formed on the flexible dielectric substrate such that each sensor is also in contact with a portion of the flexible piezoresistive material. Sensor circuitry is configured to selectively energize the sensors, and to receive sensor signals from the array of sensors. Each sensor signal represents a force associated with a corresponding one of the sensors. The flexible dielectric substrate, the piezoresistive material, and the array of sensors are configured for wrapping around the steering wheel such that the array of sensors conforms to a portion of a circumference of the steering wheel.

According to another class of implementations, a sensor system includes a flexible piezoresistive substrate, and an array of sensors. Each sensor includes at least two conductive traces formed on the flexible piezoresistive substrate. Sensor circuitry is configured to selectively energize the sensors, and to receive sensor signals from the array of sensors. Each sensor signal represents a force associated with a corresponding one of the sensors. The flexible piezoresistive substrate and the array of sensors are configured for wrapping around the steering wheel such that the array of sensors conforms to a portion of a circumference of the steering wheel.

According to a specific implementation of either class of implementations, the sensor circuitry is configured to adjust each of the sensor signals with calibration data for the corresponding sensor, thereby substantially normalizing force data derived from the sensor signals. According to a more specific implementation, the sensor circuitry is configured to repeatedly recalculate the calibration data for each of the sensors after the sensor system is integrated with the steering wheel.

According to a specific implementation of either class of implementations, the sensor circuitry is configured to detect a grip event associated with consecutively arranged sensors of the sensor array by determining that a force associated with each of the consecutively arranged sensors exceeds a threshold for a specified duration.

According to a specific implementation of either class of implementations, the sensor circuitry is configured to detect a swipe event associated with consecutively arranged sensors of the sensor array by determining that a positive change in force associated with each of the consecutively arranged sensors exceeds a first threshold for a first specified duration, and a negative change in force associated with each of the consecutively arranged sensors exceeds a second threshold for a second specified duration.

According to another class of implementations, a sensor system includes an array of sensors configured for integration with the steering wheel such that the array of sensors conforms to a portion of a circumference of the steering wheel. Sensor circuitry is configured to selectively energize the sensors, and to receive sensor signals from the array of sensors. Each sensor signal represents a force associated with a corresponding one of the sensors. The sensor circuitry is configured to adjust each of the sensor signals with calibration data for the corresponding sensor, thereby substantially normalizing force data derived from the sensor signals. The sensor circuitry is also configured to recalculate the calibration data for each of the sensors after the sensor system is integrated with the steering wheel.

According to another class of implementations, a sensor system includes an array of sensors configured for integration with the steering wheel such that the array of sensors conforms to a portion of a circumference of the steering wheel. Sensor circuitry is configured to receive sensor signals from the array of sensors. Each sensor signal represents a force associated with a corresponding one of the sensors. The sensor circuitry is configured to detect a grip event associated with first consecutively arranged sensors of the sensor array by determining that a force associated with each of the first consecutively arranged sensors exceeds a first threshold for a first specified duration. The first sensor circuitry is also configured to detect a swipe event associated with second consecutively arranged sensors of the sensor array by determining that a positive change in force associated with each of the second consecutively arranged sensors exceeds a second threshold for a second specified duration, and a negative change in force associated with each of the second consecutively arranged sensors exceeds a third threshold for a third specified duration.

A further understanding of the nature and advantages of various implementations may be realized by reference to the remaining portions of the specification and the drawings.

DETAILED DESCRIPTION

Figure 1:
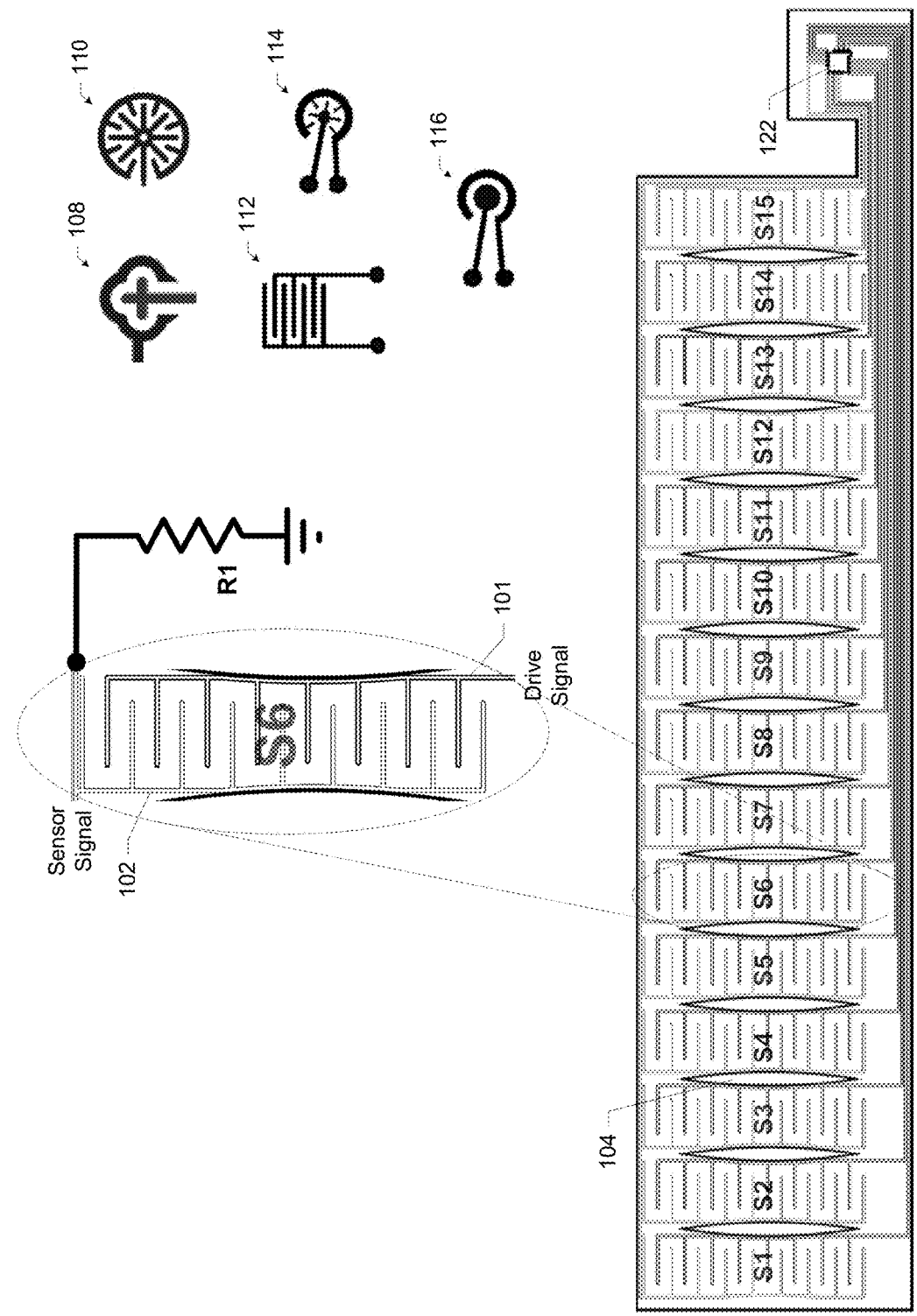
FIG. 1 shows a particular implementation of steering wheel sensor system.

Sensors and sensor systems incorporating piezoresistive materials are described in this disclosure. In particular, sensor systems for integration with vehicle steering wheels are described. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force (e.g., pressure, impact, distortion, etc.) applied to the material. One class of sensors described herein includes conductive traces formed directly on or otherwise integrated with a flexible substrate of piezoresistive material, e.g., a piezoresistive fabric or other flexible material. Another class of sensors described herein includes conductive traces formed directly on or otherwise integrated with a flexible dielectric substrate with flexible piezoresistive material that is adjacent and/or tightly integrated with the dielectric substrate and in contact with (or in some cases held slightly off of) portions of the traces. When force is applied to such a sensor, the resistance between traces connected by the piezoresistive material changes in a time-varying manner that is representative of the applied force.

A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable control circuitry), and potentially mapped (e.g., by the associated processor, controller, or control circuitry) to a control function that may be used in conjunction with virtually any type of process, device, or system. It should be noted that the output signals from such sensors may also be used to detect a variety of distortions and/or deformations of the substrate(s) on which they are formed or with which they are integrated such as, for example, bends, stretches, torsions, rotations, etc. In addition, arrays of sensors having various configurations are described in this disclosure.

Printing, screening, depositing, thermally transferring, or otherwise forming conductive traces directly on flexible substrates allows for the creation of a sensor or sensor array that fits any arbitrary shape or volume. The piezoresistive material on which the traces are formed or with which the traces are in contact may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the piezoresistive material or a flexible dielectric substrate using any of a variety of conductive inks or paints. More generally, implementations are contemplated in which the conductive traces are formed using any flexible conductive material that may be formed on a flexible substrate. It should be understood with reference to the foregoing that, while specific implementations are described with reference to specific materials and techniques, the scope of this disclosure is not so limited.

Both one-sided and two-side implementations are contemplated, e.g., conductive traces can be printed or formed on one or both sides of a flexible substrate. As will be understood, two-sided implementations may require some mechanism for connecting conductive traces on one side of the substrate to those on the other side. Some implementations use vias in which conductive ink or paint is flowed through the vias to establish the connections. Alternatively, conductive vias or rivets may make connections through the flexible substrate. Both single and double-sided implementations may also use insulating materials formed over or under conductive traces. This allows for the stacking or layering of conductive traces and signal lines, e.g., to allow the routing of signal line to isolated structures in a manner analogous to the different layers of a printed circuit board.

Routing of signals on and off the flexible substrate may be achieved in a variety of ways. For example, some implementations might use elastomeric connectors (e.g., ZEBRA® connectors) which alternate conductive and non-conductive rubber at a density typically an order of magnitude greater than the width of the conductive traces to which they connect (e.g., at the edge of the substrate). Alternatively, a circuit board (possibly made of a flexible material such as Kapton), or a bundle of conductors may be riveted or otherwise secured to the substrate. The use of rivets may also provide mechanical reinforcement to the connection.

According to some implementations, matching conductive traces or pads on the flexible substrate and a circuit board can be secured to each other using, for example, a layer of conductive adhesive (e.g., a conductive epoxy such as Masterbond EP79 from Masterbond, Inc. of Hackensack, N.J.) applied to one or both of the surfaces which are then mated to each other. The conductive traces or pads can also be held together with additional mechanical elements such as sonic welds or rivets. If conductive rivets are used to make the electrical connections to the conductive traces of the flexible substrate, the conductive adhesive may not be required. Conductive threads may also be used to connect the conductive traces of the flexible substrate to an external assembly. The wide range of variations within the scope of this disclosure will be apparent to those of skill in the art.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material is a polyester felt selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. The fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphenes that are formed to grip the fabric. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of flexible materials that exhibit a change in resistance or conductivity when force is applied to the material may be suitable for implementation of sensors as described herein.

According to a particular class of implementations, conductive traces having varying levels of conductivity are formed on flexible piezoresistive material or a flexible dielectric substrate using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable and can handle creasing, washing, etc. The degree of conductivity for different traces and applications is controlled by the amount or concentration of conductive particles (e.g., silver, copper, aluminum, carbon, etc.) suspended in the silicone. These inks can be screen printed or printed from an inkjet printer. Another class of implementations uses conductive paints (e.g., carbon particles mixed with paint) such as those that are commonly used for EMI shielding and ESD protection.

Additional examples of sensors and arrays of sensors that may be used with various implementations enabled by the present disclosure are described in U.S. Patent Publication No. 2015/0331522 entitled Piezoresistive Sensors and Applications filed on Jun. 9, 2014, and U.S. Patent Publication No. US 2015/0331523 entitled Two-Dimensional Sensor Arrays filed on Aug. 20, 2014, the entire disclosures of both of which are incorporated herein by reference for all purposes. However, it should also be noted that implementations are contemplated that employ a variety of other suitable sensor technologies.

Automobiles and other vehicles have become increasingly instrumented and there continues to be interest in gathering data relating to various vehicle subsystems and components for a wide variety of applications. According to a particular class of implementations, a steering wheel sensor system is provided in which a sensor array is attached to or integrated with a steering wheel and is configured to provide information regarding forces exerted on the steering wheel, e.g., by the hands of a driver. FIG. 1 is an illustration of an example of such a sensor system.

The depicted steering wheel sensor system includes fifteen sensors that capture data at locations around a steering wheel to which it is attached or with which it is integrated. According to some implementations, the strip of material with which the sensors are integrated is wrapped around at least a portion of the torus of the steering wheel. According to some of these implementations, the strip runs lengthwise along the circumference of the steering wheel with the width of the strip being wrapped around the steering wheel (e.g., see FIG. 3). And depending on the implementation, there may be one or multiple such sensor arrays to capture force information around all or only portions of the steering wheel.

In the example of FIG. 1, the sensors are implemented with conductive trace patterns that are formed directly on or otherwise integrated with a flexible substrate; either a piezoresistive material or a dielectric material. In the case of the former, portions of the conductive traces that are not intended to be part of a sensor (e.g., signal routing traces) may be shielded or insulated from the piezoresistive material to reduce any unwanted contributions to the sensor signals. For example, the portions of the conductive traces that bring the drive and sense signals to and from the sensors may be insulated from the piezoresistive material using, for example, a dielectric or non-conducting material (shaded portion of the array at the bottom of the figure) that is formed on the piezoresistive material before the conductive traces. Portions of the conductive traces are then formed over the insulating material. The insulating material may also be formed over the conductive traces to allow traces to cross or be routed in the same area.

In the depicted implementation there are 15 sensors, S1-S15. Each of the sensors includes two adjacent traces, the respective patterns of which each include extensions that alternate or are "interdigitated" with the extensions of the other. See, for example, the magnified view of sensor S6. As will be appreciated, a wide variety of trace patterns having various geometries, numbers of traces, and spacings are contemplated (trace patterns 108-116 are some representative examples). One of the traces 101 receives a drive signal; the other trace 102 transmits the corresponding sensor signal to associated sensor circuitry (e.g., on PCB 122). The drive signal might be provided, for example, by connecting the trace (permanently or temporarily) to a voltage reference, a signal source that may include additional information in the drive signal, a GPIO (General Purpose Input Output) pin of an associated processor or controller, etc.

And as shown in the example in FIG. 1, the sensor signal might be generated using a voltage divider in which one of the resistors of the divider includes the resistance between the two traces of the sensor through the intervening piezoresistive material. The other resistor (represented by R1) might be included, for example, with the associated sensor circuitry. As the resistance of the piezoresistive material changes with applied force or pressure, the sensor signal also varies as a divided portion of the drive signal. As will be understood, any of a wide variety of transformations of the drive signal via the change in resistance of the piezoresistive material may be employed for particular applications.

The sensors are energized (via the drive signals) and interrogated (via the sensor signals) to generate an output signal for each that is a representation of the amount of force exerted on or near that sensor. As will also be appreciated, and depending on the application, implementations are contemplated having more or fewer sensors.

According to various implementations, different sets of sensors may be selectively energized and interrogated thereby reducing the number and overall area of traces on the substrate, as well as the required connections to sensor circuitry on an associated PCB (e.g., PCB 122). In the implementation depicted in FIG. 1, the 15 sensors are driven sequentially so that they can share the same sensor signal line. Alternatively, the sensor system of FIG. 1 could include additional sensors with the same number of connections to PCB 122. For example, 28 sensors (rather than 15) might be driven via 14 drive signal outputs from the sensor circuitry (not shown) on PCB 122, and the sensor signals could be received via 2 sensor signal inputs (rather than 1) to the sensor circuitry on PCB 122; with the same number of connections between the substrate and the PCB (i.e., 16 in the depicted example). The set of sensors providing sensor signals to one of the 2 sensor signal inputs (e.g., the even numbered sensors or the odd numbered sensors) may be energized in any suitable sequence or pattern such that any signal received on the corresponding sensor signal input can be correlated with the corresponding sensor drive signal by the sensor circuitry. And because the sensor signals in such an implementation would be received by the sensor circuitry via two different sensor signal inputs, two sensors can be simultaneously energized as long as they are connected to different sensor signal inputs to the sensor circuitry. This allows for the sharing of drive signal lines. Other suitable variations on this theme will be understood by those of skill in the art to be within the scope of this disclosure.

According to some implementations, PCB 122 may be connected to the conductive traces of the sensor array as described U.S. Patent Publication No. 2015/0331533 entitled Flexible Sensors and Applications filed on Mar. 27, 2015, the entire disclosure of which is incorporated herein by reference for all purposes. According to other implementations, any of a variety of techniques may be employed to make such a connection including, for example, elastomeric connectors (e.g., ZEBRA® connectors) which alternate conductive and non-conductive rubber at a density typically an order of magnitude greater than the width of the conductive traces to which they connect (e.g., at the edge of the fabric). A variety of other suitable alternatives are available to those of skill in the art.

Figure 2:
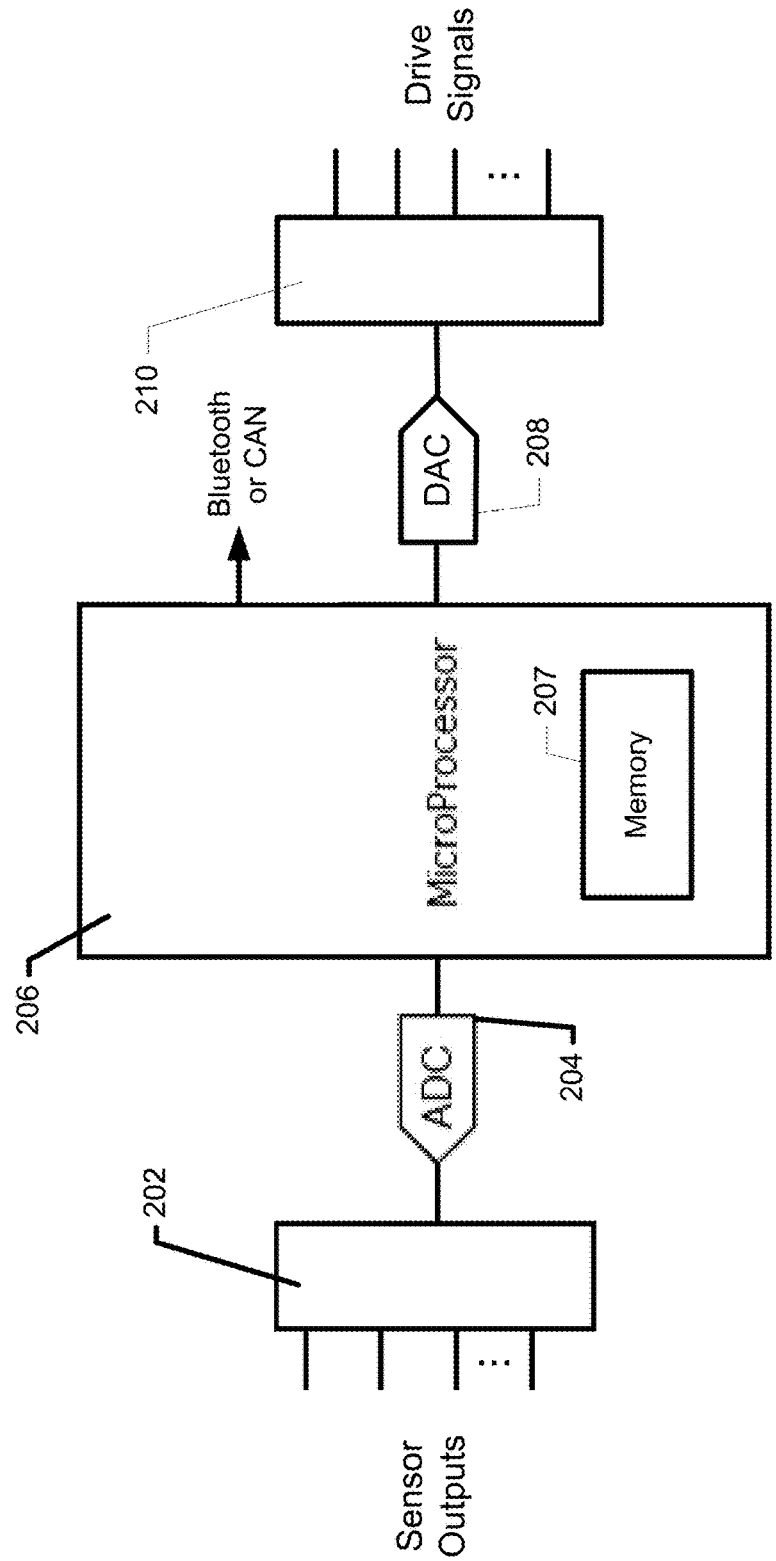
FIG. 2 is a simplified block diagram of sensor circuitry suitable for use with various implementations.

FIG. 2 is a simplified diagram of sensor circuitry that may be provided on a PCB for use with implementations described herein. For example, in the implementation described above with reference to FIG. 1, such sensor circuitry could be provided on PCB 122 and connected to the conductive traces associated with sensors S1-S15. When pressure is applied to one of the sensors, a resulting signal (captured via the corresponding traces) is received and digitized (e.g., via multiplexer 202 and A-to-D converter 204) and may be processed locally (e.g., by processor 206) and/or transmitted to a connected device or application (e.g., via a wired or a wireless connection). For example, the steering wheel sensor system might communicate (wired or wirelessly) over an automotive Controller Area Network (CAN), a local interconnect network (LIN), an Ethernet network, a Bluetooth or other wireless connection, etc., with one or more of a vehicle's onboard computing or control systems. Alternatively, or in addition, the system might communicate with an application on, for example, a smart phone or tablet.

The sensors may be selectively energized by the sensor circuitry (e.g., under the control of processor 206 via D-to-A converter 208 and multiplexer 210) to effect the generation of the sensor signals. The sensor circuitry may be powered, for example, by the vehicle's electrical system (e.g., via the steering column and/or hub of the steering wheel). Alternatively, the sensor circuitry might have an associated power source such as, for example, a battery, an energy-harvesting power supply (e.g., the LTC3588 provided by Linear Technology Corporation of Milpitas, Calif.), or the like. Processor 206 may be implemented using any of a wide variety of controllers such as, for example, the C8051F380-GM controller provided by Silicon Labs of Austin, Tex. Memory 207 includes non-transitory computer-readable storage media that may be any of a wide variety of types of volatile and non-volatile storage media, and may include computer readable instructions, data structures, program modules, logic, firmware, and/or other data that implement or support the functionalities described herein.

It should be noted that the sensor circuitry of FIG. 2 is only one example of how the various functionalities described herein may be implemented. In addition to the wide variety of processors, controllers, and similar commercially available devices that may be employed, other types of devices and circuits may be employed. For example, many of the functionalities described herein could be implemented using application-specific integrated circuits (ASICs), programmable logic devices (PLDs), or field-programmable gate array (FPGA) devices. Various combinations of discrete digital and/or analog circuit components may also be used. The scope of the present disclosure should therefore not be limited by the specific examples of sensor circuitry described herein.

Figure 3:
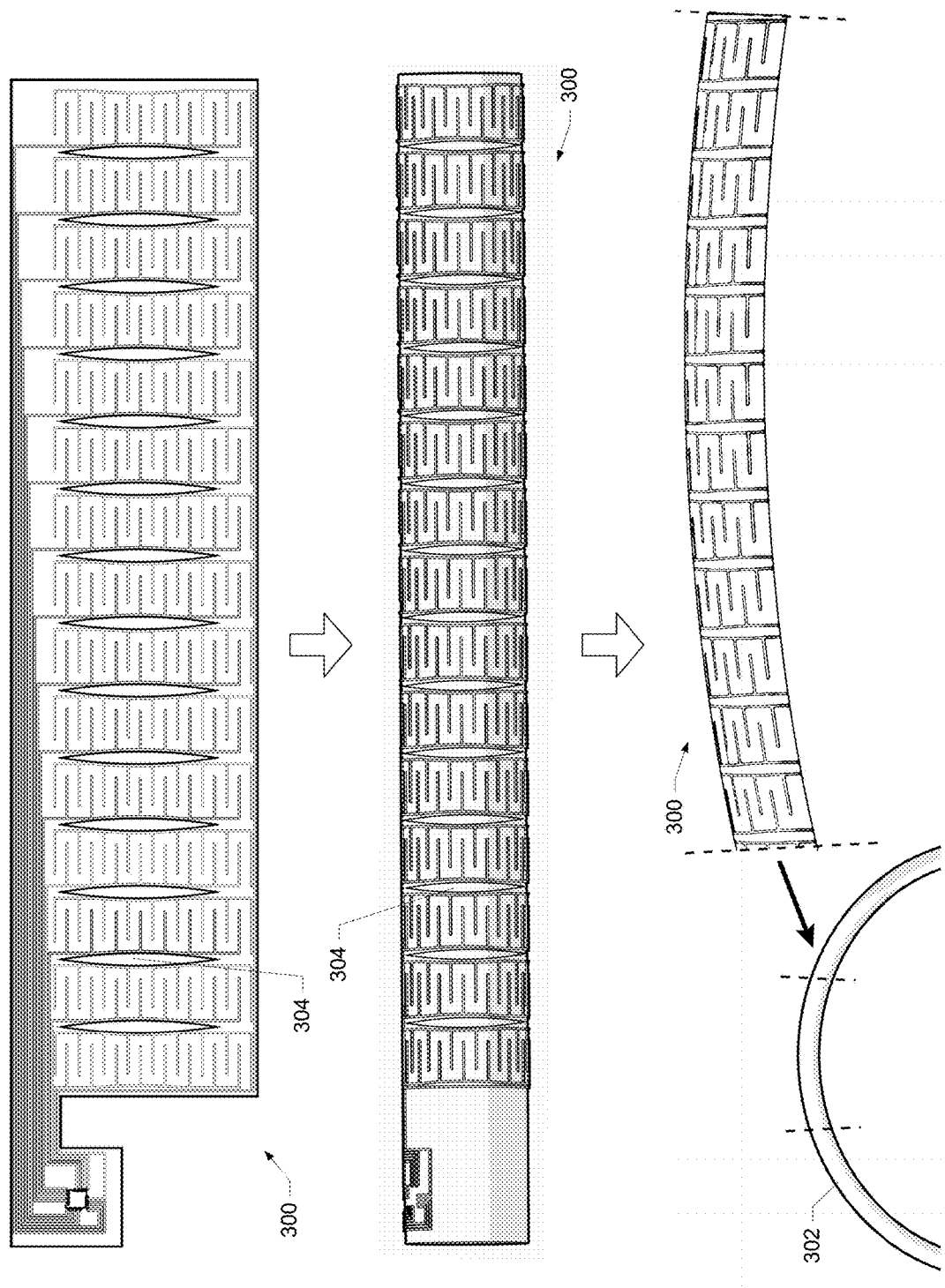
FIG. 3 illustrates integration of a sensor system with a steering wheel according to a particular implementation.

One way in which a sensor system implemented as described herein may be integrated with a steering wheel may be understood with reference to FIG. 3. Sensor system 300 is shown at the top of the figure in its flattened configuration and then, in the middle of the figure, wrapped around a cylindrical surface. At the bottom of the figure, a portion of sensor system 300 is shown in relation to a section of steering wheel 302 around which it may be wrapped; following the curve of steering wheel 302. One or multiple instances of sensor system 300 may be provided around the circumference of steering wheel 302 to provide desired coverage. Any of a variety of materials (e.g., leather or other standard materials) may be wrapped around the sensor system to provide a desired look and feel, protect the sensors from the environment, etc.

As shown in FIGS. 1 and 3, the flexible substrate of the sensor system may include relief cutouts (e.g., 104, 304) that allow the substrate to conform to the shape of the steering wheel. According to a particular implementation, the sensors are spaced with their centers approximately an inch apart allowing for sufficient resolution to distinguish, for example, the individual fingers of the driver. More generally, the sensor may be configured to detect multiple contact points substantially simultaneously. For example, the pressure distribution over the fingers of each of the driver's hand could be captured. The pressure required to activate a sensor may be configurable as well. According to a specific implementation, the sensor activation threshold is in the range of about 50-100 grams of pressure.

The sensitivity of each individual sensor can be adjusted in a variety of ways. For example, the distance between and/or the numbers of the interdigitated extensions of the conductive trace patterns may be manipulated. The conductivity of the trace patterns may also be manipulated. Mechanical elements can focus the forces to the area between the interdigitated conductors; effectively providing a "lens" to direct the grip pressure to parts of the sensor that are active. See, for example, mechanical elements described in U.S. Patent Publication No. 2015/0331523 referenced above. Software multipliers can be used on values derived from sensor signals to adjust sensitivity, as well as adjustments to the levels of the drive signals used to energize the sensors. In addition, the number of sensors may vary considerably for different applications to achieve a desired resolution for a wide range of steering wheel diameters, thicknesses, and types. According to some implementations, sensitivity may be controlled in response to external conditions such as, for example, temperature and/or humidity which can affect the stiffness of the materials (e.g., leather wrapping) associated with the sensor system.

According to a particular implementation, when the steering wheel sensor system powers up, the sensors may be calibrated using an "auto zero" process by which each sensor is energized and interrogated with the resulting value being stored by the system as corresponding to zero force. However, if the value for one or more of the sensors is disproportionate (particularly for consecutive sensors in the array) this may be treated as if the steering wheel is already being touched. In such a case, previously stored values may be used as the zero-pressure baseline.

According to a particular class of implementations, drive signals may be routed to the sensors on the piezoresistive substrate and/or sensor signals may be routed from the sensors to the sensor circuitry via an adjacent substrate. Such an approach might be useful, for example, to allow the sensors to occupy more of the width of the piezoresistive substrate than might otherwise be possible. According to a particular implementation, contacts for each of the sensors are formed on the piezoresistive substrate on which the sensors are included. For example, referring to the sensor array shown in FIG. 1, such a contact might be formed at the bottom right-hand corner of sensor S6 where the drive signal is applied and/or at the upper left-hand corner where the sensor signal is transmitted. Similar contacts could be formed near each of the other sensors.

Figure 4:
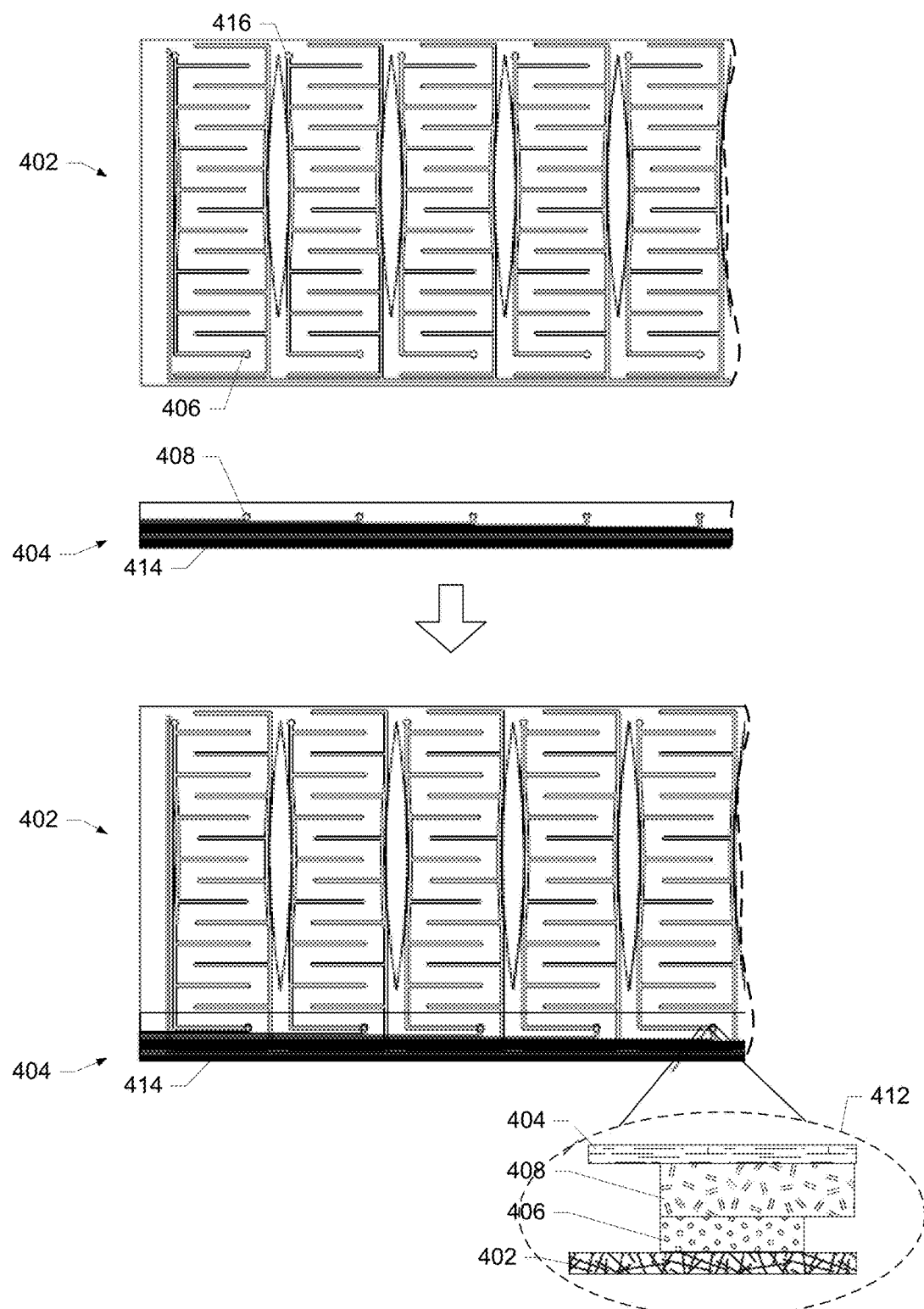
FIG. 4 shows part of a steering wheel sensor system according to a particular implementation.

FIG. 4 illustrates an implementation of a sensor array similar in some respects to the arrays of FIGS. 1 and 3, but in which traces routing drive signals from associated sensor circuitry (not shown) to the sensor trace patterns on piezoresistive substrate 402 are provided on a separate substrate 404. Only portions of substrates 402 and 404 are shown for clarity. In the example depicted, each sensor on substrate 402 has an associated contact 406 which corresponds to a matching contact 408 on substrate 404.

As shown in the bottom half of FIG. 4, substrates 402 and 404 are placed adjacent each other and joined such that each pair of matching contacts makes an electrical connection. FIG. 4 provides a cross-sectional view 412 of the resulting vertical stack at a pair of matching contact points with piezoresistive substrate 402 at the bottom, matching contact points 406 and 408 in the middle, and substrate 404 at the top. As will be understood the depicted orientation of the stack is arbitrary and the features are not necessarily drawn to scale. Substrate 404 also includes conductive traces 414 connected to corresponding ones of contacts 408 that route each of the drive signals from the sensor circuitry to the corresponding sensor via the matching contacts. The sensor circuitry could be on a PCB that is attached to or integrated with the adjacent substrate (e.g., as described in U.S. Patent Publication No. 2015/0331533 referred to above). Alternatively, the sensor circuitry could be on a PCB that is attached to or integrated with the piezoresistive substrate or even another substrate (e.g., as described in Publication No. 2015/0331533) using another set of conductive traces and matching contacts that transmit the drive signals from one substrate to the other. As will be appreciated, additional traces on the same or an additional substrate (not shown) might also be provided for routing sensor signals from the sensor trace patterns to the sensor circuitry, e.g., via contacts 416.

According to a particular implementation, the adjacent substrate on which signals are routed is a thermoplastic polyurethane (TPU) (such as, for example, Products ST604, ET315, or 3918 from Bemis Associates Inc. of Shirley, Mass.) on which the matching contacts and conductive traces are screen printed using a conductive flexible ink such as, for example, conductive silicone-based inks manufactured by E.I. du Pont de Nemours and Company (DuPont) of Wilmington, Del., and/or Creative Materials of Ayer, Mass. When the TPU substrate and its traces and contacts are properly aligned with the matching contacts on the piezoresistive substrate, the assembly is pressed and heated to fix the substrates to each other and to establish the electrical connections between the matching contacts on the respective substrates. As will be appreciated, insulators and/or dielectrics may be formed over the traces on the TPU substrate before making the connections to insulate them from the traces on the piezoresistive substrate and from the piezoresistive substrate itself. The traces on the TPU substrate may also be formed on the side of the TPU substrate opposite the piezoresistive substrate with vias to the contacts on the opposing side.

Figure 5:
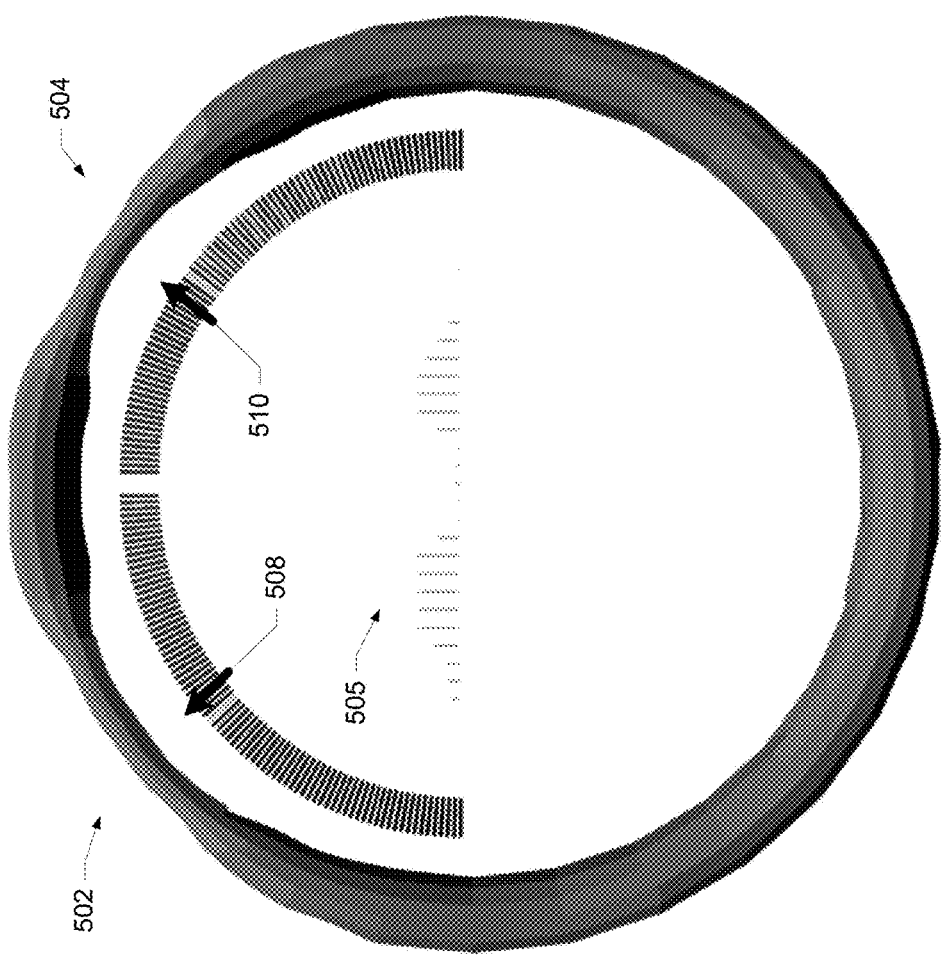
FIG. 5 provides visual representations of data generated by a steering wheel sensor system according to a particular implementation.

For illustrative purposes, FIG. 5 provides a depiction of a virtual representation of pressure exerted on a steering wheel as captured by steering wheel sensor system enabled by the present disclosure. In the depicted example, the pressure of two hands gripping the steering wheel is represented in three different ways. One way of depicting the pressure is by modifying the apparent width of the steering wheel in accordance with the sensor values generated by the sensor system as shown at locations 502 and 504. The width of the affected area and the apparent constriction of the steering wheel represents the width and the force of the driver's grip for each of the grip locations. A second way of depicting the pressure is to provide a bar graph representation 505 as shown in the center of the figure in which the sensor values are used to generate the graph. Yet another way to depict the information captured by the sensor system is to calculate a centroid of the pressure for each quadrant of the steering wheel (represented by arrows 508 and 510) from the sensor values. Each of these representations may be dynamic; reflecting changes in the location(s) and magnitude(s) of the pressure exerted on the steering wheel substantially in real time. It should be noted that the depicted representations are merely examples which should serve to inform those of skill in the art of the many ways in which sensor data may be represented or transformed and the correspondingly wide range of applications that may be enabled with steering wheel sensor systems enabled by the present disclosure.

Figure 6:
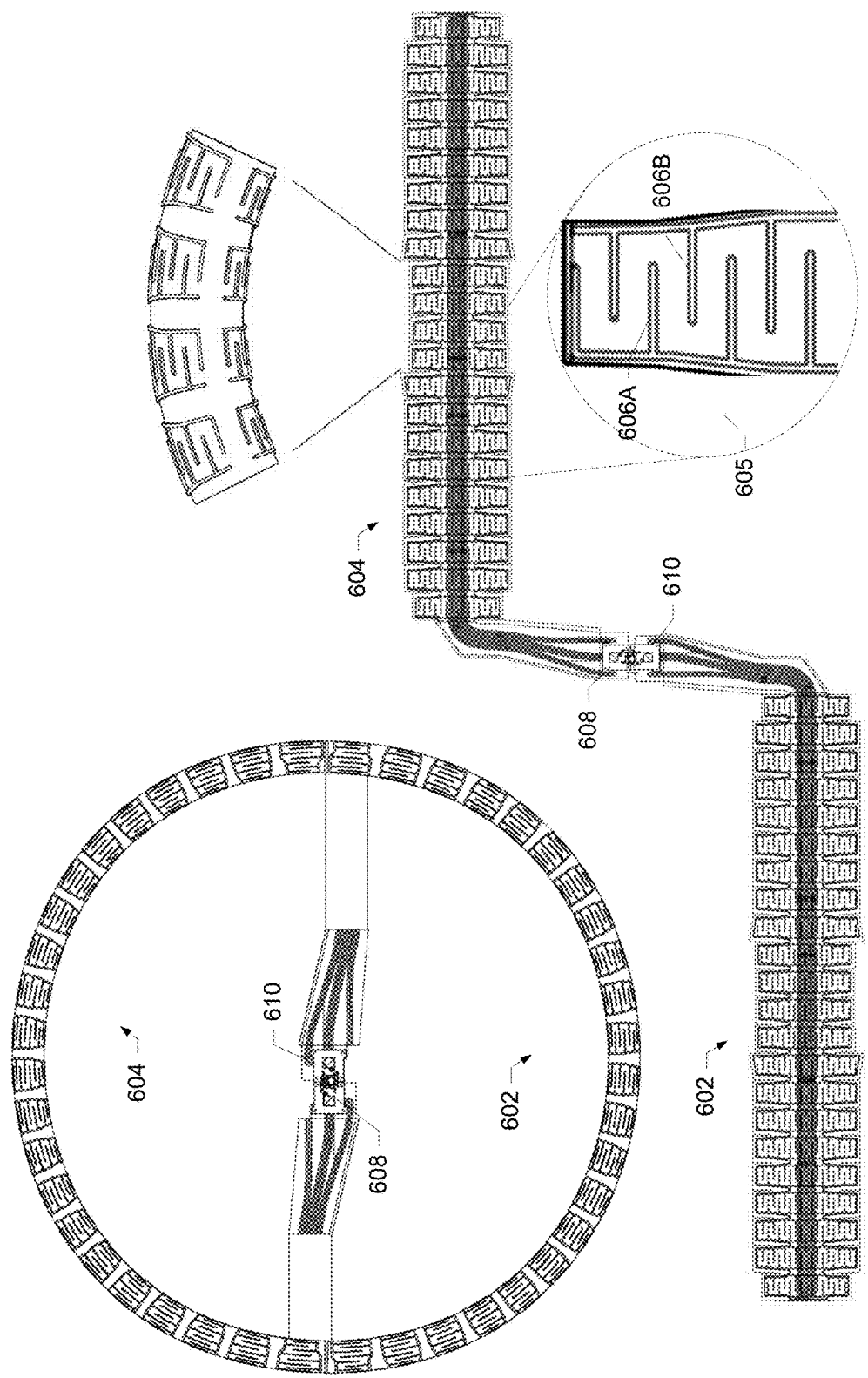
FIG. 6 illustrates integration of a sensor system with a steering wheel according to another implementation.

FIG. 6 illustrates integration of a sensor system with a steering wheel according to another implementation. In the depicted implementation, the circumference of the steering wheel is instrumented with two sensor arrays 602 and 604, each of which operates in a manner similar to that described above with reference to the sensor system of FIG. 1. Forty-four sensors are wrapped around the steering wheel split, in this example, into an upper array (604) and a lower array (602) with twenty-two sensors each. As discussed with reference to the various implementations described herein, the flexibility of the substrates of the sensor system and the conductive materials from which the sensors are formed, and the shapes and spacings of the sensors and relief cutouts allow for sensor systems enabled by the present disclosure to conform to a wide range of steering wheels. The configuration in the upper-left-hand corner of FIG. 6 illustrates an example of how arrays 602 and 604 might be integrated with a steering wheel, while the configuration in the center of the drawing shows the arrays in a flattened arrangement.

Similar to the sensors of FIG. 1, each of the sensors in arrays 602 and 604 includes at least two adjacent traces, the respective patterns of which each include extensions that alternate or are interdigitated with the extensions of the other as shown in magnified view 605 of a portion of one of the sensors that includes interdigitated trace patterns 606A and 606B. The trace patterns of each sensor are connected via piezoresistive material with which they are in contact or on which they are formed and form a resistive divider circuit with another resistive element (not shown). The sensors in each array are connected to associated sensor circuitry (e.g., the sensor circuitry of FIG. 2) on PCBs enclosed by respective connector assemblies 608 and 610 via routing conductors that run longitudinally down the center of each array as shown (the shaded portion of the arrays in the flattened configuration. These conductors may be suitably insulated from the sensors to which they are not connected and the piezoresistive material of the array, and connected to the associated sensor circuitry on their respective PCBs as described above.

The size and shape of individual sensors in the sensor system may vary as shown in the figure to account for variations in the shape of the steering wheel with which the system is integrated. For example, although most steering wheels are generally toroidal in shape, they exhibit significant variation in the thickness and shape of the cross-section of the wheel at different locations around their circumferences. The size of individual sensors may therefore be designed to avoid unnecessary or undesirable overlap for any given sensor when the system is wrapped around the wheel. In another example, steering wheels also typically have some sort of structure(s) that connect the wheel to the steering column, e.g., spokes, cross-bars, hubs, etc. The lengths and/or shapes of sensors that coincide with such structures may be designed to accommodate such structures while providing the desired sensor coverage. The sizes and shapes of the spaces between the sensors (and the relief cutouts of the various substrates of the system) may also be designed to ensure that the sensor array(s) conform(s) to the contours of the steering wheel.

Connector assemblies 608 and 610 connect to each other as depicted in both configurations such that, when integrated with the steering wheel the connector assemblies meet at or near the center or hub of the steering wheel as shown in the upper-left-hand configuration of FIG. 6. As will be understood, the entirety of both arrays would be concealed within the steering wheel and its outer covering. It will also be understood that the number of arrays and the number of instances of sensor circuitry controlling the operation of the array(s) may vary. For example, multiple sensor arrays could be controlled by common sensor circuitry, and/or the steering wheel could be instrumented with only a single array of sensors rather than multiple arrays. In another example, more than two arrays might be used to fully instrument a steering wheel, with one or more instances of sensor circuitry to control operation of one or more of the arrays. In another example, for steering wheels having spokes connecting the wheel to a central hub (particularly larger steering wheel associated with trucks and buses), the spokes may be instrumented as described herein to enable detection of force on both the wheel and the spokes. A wide range of other variations will be appreciated by those of skill in the art.

According to some implementations in which a heating system is integrated with the steering wheel, the ground(s) of the sensor system may be connected to the ground of the heating system. This may provide advantages that contribute to the reliability of the sensor system such as, for example, protection of the various components of the sensor system from damage due to electrostatic discharge (ESD). Such grounding may also serve to make the operation of the sensor system more robust in the face of radio frequency noise and other types of electromagnetic interference (EMI); in some cases reducing noise that interferes with reliable detection of forces acting on the steering wheel.

Figure 7:
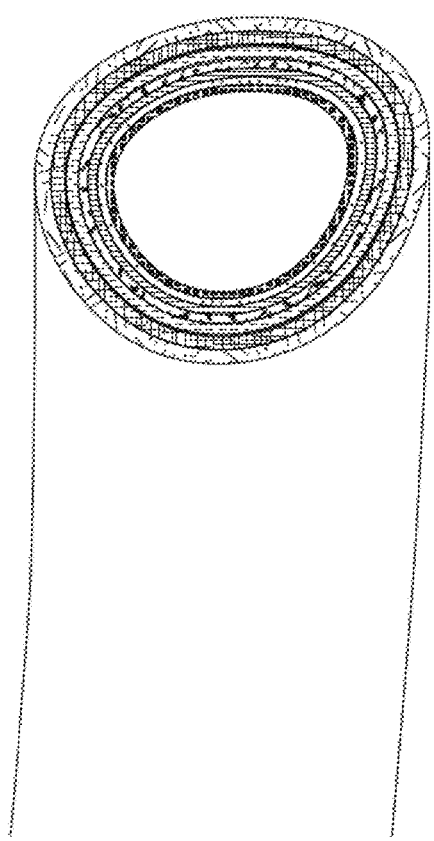
FIG. 7 shows a cross-sectional view of the layers of a steering wheel sensor system according to a particular implementation.
Figure 8:
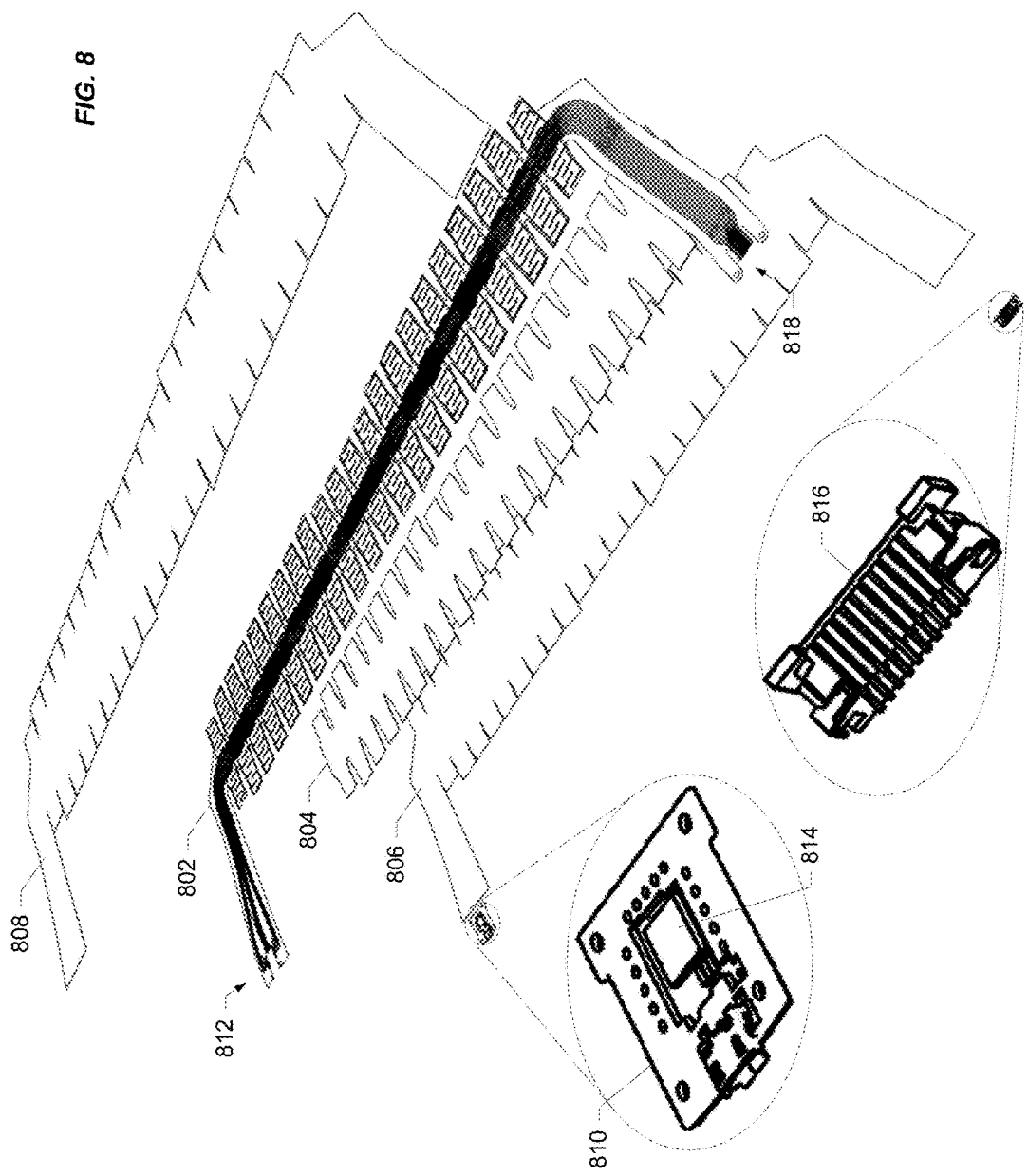
FIG. 8 shows an exploded view of the layers of a steering wheel sensor system according to a particular implementation.

FIG. 7 shows a cross section of the layers of a sensor system as wrapped around a steering wheel. FIG. 8 shows a flattened and exploded view of the layers of a sensor system that may be integrated with a steering wheel as shown in FIG. 7. Referring to FIG. 7, the layer closest to steering wheel 702 is heating layer 704 which includes the steering wheel heating system and its associated electronics. A layer of pressure-sensitive adhesive (PSA) 704 is provided around heating layer 704 to which the sensor system (including layers 706-714) is secured. The steering wheel and the heating and sensor systems are then wrapped with an outer covering, in this case, leather 716. It will be understood that more or fewer layers using different combinations of materials may be used for different implementations.

Referring to FIG. 8, the sensor trace patterns, signal routing traces, and insulators of the sensor array are screen printed on a substrate 802 which may be, for example, a flexible PET (polyethylene terephthalate) substrate (e.g., PET 710). In the depicted implementation, piezoresistive substrate 804 (e.g., fabric 712) is a continuous layer of material. Alternatively, the piezoresistive material may be isolated piezoresistive "patches" of material aligned with individual sensors or groups of sensors. These patches may have shapes that are suitable for a given sensor trace pattern or an arrangement of the corresponding group of sensors.

According to a particular implementation, piezoresistive substrate 804 (or the piezoresistive patches) is (are) adhered to a substrate 806 which may be, for example, a non-permeable, flexible material such as, for example, a thermoplastic polyurethane or TPU, such as those available from Bemis Associates Inc. of Shirley, Mass. (e.g., TPU 714). The piezoresistive material may be adhered to the TPU by selective heating or using a suitable adhesive. Similarly, substrate 802 is adhered to a substrate 808 which has substantially the same shape as substrate 806 and may be constructed of the same or substantially similar material (e.g., TPU 708).

Substrate 804 is positioned relative to the substrate 802 such that the sections between the cutouts along its edges are aligned with the corresponding sensor trace patterns. The substrates are then thermally pressed together so substrate 808 melts into substrate 806 (at least for implementations including TPU substrates), bringing the sensor trace patterns and the piezoresistive material into intimate contact, and forming a hermetic seal around the sensor array and the routing traces leading to sensor circuitry. The seal provides environmental protection for the sensors and traces and helps hold the individual sensor components in position resulting in a robust and tightly integrated unit.

Environmental protection can be particular advantageous for the conductive inks from which the sensors and traces are constructed given their tendency to oxidize and degrade over time when exposed to various environmental contaminants. Such a construction may be useful in protecting the sensor array from environmental conditions and shear forces, but may also enable a wide dynamic range of operation for each of the sensors depending on the thickness and/or rigidity of the materials selected.

According to an alternative implementation, the sensor trace patterns and routing conductors of the sensor array may be formed (e.g., printed) on substrate 808 (e.g., TPU 708) rather than substrate 802, eliminating the need for an additional substrate. The sensor trace patterns and conductors may be formed on one or both sides of substrate 808. For example, the sensor trace patterns could be formed on the underside of substrate 808 (i.e., the side facing the piezoresistive material) with the routing conductors formed on the upper side of substrate 808. As discussed above and in one or more of the patent publications referred to herein, connections can be made between the sensor trace patterns and their corresponding routing conductors using apertures or vias through substrate 808.

The conductors of the sensor array may be connected to the sensor circuitry that controls operation of the sensor system in a variety of ways. Two alternative examples are shown in FIG. 8. It will be appreciated that the two options are depicted together for convenience but that a typical implementation would only include one such option for a given sensor array. According to a first option, connector assembly 810 (shown in a magnified view) connects with the routing traces of substrate 802 at cutout 812. This may be accomplished, for example, as described in U.S. Patent Publication No. 2015/0331533 referred to elsewhere herein. Connector assembly 810 includes sensor circuitry (e.g., as described above with reference to FIG. 2) on PCB 814 that may be configured to operate with any subset or combination of the functionalities described herein. As described above, connector assembly 810 may be configured to connect with another similar connector assembly of another sensor array (e.g., see connectors assemblies 608 and 610 of FIG. 6). Alternatively connector assembly 810 may be configured to connect to other vehicle systems.

According to a second option, connector 816 (shown in a magnified view) connects with the routing traces of substrate 802 at cutout 818 to provide connectivity to sensor circuitry on another assembly (not shown). Connector 816 might be, for example, any of a variety of flat flexible cable (FFC) connectors, flexible printed circuit (FPC) connectors, ribbon connectors, and the like. According to a particular implementation, connector 816 is a zero-insertion-force (ZIF) flat flex connector such as, for example, connectors available from Molex Incorporated of Lisle, Ill. A wide variety of other suitable connection technologies will be apparent to those of skill in the art, the nature of which will depend, in part, on factors such as specific requirements of the vehicle manufacturer, the nature of the sensor circuitry, and/or the nature of the vehicle system(s) with which the sensor system is intended to interact.

As will be understood, the responses of the sensors in arrays enabled by the present disclosure may exhibit variation relative to each other. According to some implementations, calibrated sensor data are stored (e.g., in memory 207 of processor 206) representing the response of each of the sensors. Such data may also account for changes in individual sensor response over temperature. Calibration data can also account for variations caused by mechanical differences experienced by different sensors based on where each sensor is located in the array. Such data may be used for ensuring consistency in the way the sensor outputs are processed and/or used to represent applied forces. During calibration, the output of each sensor (e.g., as captured by ADC 204) is measured for a range of known input forces (and possibly temperatures as well). This may be done, for example, by placing each sensor on a scale, applying force to that sensor, and recording a value in memory for each of a plurality of ADC values that represents a corresponding value reported by the scale (possibly at a given temperature). In this way, a set of data points for each sensor is captured (e.g., in a table in memory 207) associating ADC values with corresponding forces (e.g., weights in grams or kilograms) as well as possibly temperatures. The stored data may also be in the form of offsets that are applied to the ADC values that normalize the sensors to the same scale of forces. The data set for each sensor might capture an offset or force value for every possible value of the ADC output (which may have a resolution of 10 bits or more) and/or for very small changes in temperature. Alternatively, fewer data points may be captured and the sensor circuitry may use interpolation to derive offsets or force values for ADC outputs not represented in the data set. Variations on this theme will be understood by those of skill in the art.

Both the sensitivity and dynamic range of sensor systems enabled by the present disclosure may be particularly advantageous for the integration of sensor systems with steering wheels. That is, a multilayer assembly wrapped around a steering wheel (such as the one shown in FIG. 7) will typically be wrapped tightly with a significant amount of force exerted on the sensor system in its "relaxed" state, i.e., the state in which no external forces are being exerted on the steering wheel. As will be appreciated, this force will consume much of the potential dynamic range of the sensor system, leaving only a portion of the dynamic range at the upper end of the scale for the detection of forces. Because of this reduction in dynamic range, it is advantageous that, at least for some implementations enabled by the present disclosure, the remaining dynamic range is sufficient to capture the range of forces expected. Moreover, the sensitivity to force enabled by the present disclosure also allows for sensor systems that can measure forces within that range very precisely, e.g., for every possible value of the ADC output as described above. Thus, the combination of dynamic range and sensitivity of sensor systems enabled by the present disclosure represents significant advantages relative to other sensor technology.

Generating the set of data points for each sensor may be done by applying the force individually to each sensor using, for example, a device with a footprint that matches the sensor's active area configuration (e.g., see the shape of sensor S6 of FIG. 1). It may also be done by applying force simultaneously over multiple sensors (potentially up to the entire array) using, for example, a precision inflatable bladder that distributes force evenly over the set of sensors. The measurements for a given force can then be captured by activating the sensors sequentially. Other variations will be appreciated by those of skill in the art. Regardless of how the calibration force is applied, what results is data set that the sensor circuitry may use to map the output received from each sensor to a more accurate representation of the force represented. As will be appreciated, this consistency of representation may be important for some applications.

For some applications, it may also be important to account for crosstalk among the sensors of an array. Crosstalk refers to contributions to a particular sensor's output attributable to other resistive components of the array in parallel with the resistance of the sensor of interest; often referred to as parasitic resistances. According to some implementations, the capture of a sensor's output is accomplished through the use of an analog-to-digital converter (ADC) that compares the input to a stable reference and generates an ADC Count given by:

$$\text{Count} = ADC_{max} * \left(\frac{(V_+ - V_-)}{V_{ref}}\right)$$

where $V_+ - V_-$ represents the ADC input voltage from the sensor ($V_{in}$), and $V_{ref}$ the ADC's reference. According to a particular class of implementations, it is possible to more accurately determine the value of the resistance of interest by taking multiple measurements for the sensor and combining the measurements mathematically in a way that allows for solving for the resistance of interest.

According to one such implementation, one measurement, V1, is taken with the drive signal of the sensor of interest driven high and the drive signals of all of the other sensors driven low. A second measurement, V2, is taken with the drive signal of the sensor of interest driven low and the drive signals of the other sensors driven high. Equations for V1 and V2 may be written as follows:

$$V1 = 3.3 \text{ V}\left(\frac{R?\|Rp}{R?+R\|Rp}\right)$$

$$V2 = 3.3 \text{ V}\left(\frac{R\|Rp}{R+R?\|Rp}\right)$$

where R represents the resistance of the sensor of interest, R? represents the resistance of the other resistive components of the array contributing to the measurement, Rp represents the other resistor of the sensor's voltage divider, and 3.3V represents the reference voltage of the ADC. Using substitution, we can find an equation for V1 in terms of V2 (or vice-versa), eliminating the dependence on R? as follows:

$$V1 = Rp\left(\frac{3.3 \text{ V} - V2}{R + Rp}\right)$$

$$V2 = 3.3 \text{ V} - \frac{V1(R + Rp)}{Rp}$$

Solving either of these equations for R yields:

$$R = Rp\left(\frac{3.3 \text{ V} - V2}{V1} - 1\right)$$

And since the measurements of V1 and V2 are in units of ADC Counts, we can choose Vref=Vin=3.3V such that the sensor circuitry (e.g., processor 206) can determine R, the resistance of the sensor of interest, as follows:

$$R = Rp\left(\frac{ADC_{max} - \text{Count}_{V2}}{\text{Count}_{V1}} - 1\right)$$

A more accurate determination of R allows for a more accurate determination of the force applied to the sensor of interest (e.g., using R as an index into a table of resistance vs. force values).

Modifications to this approach might be useful for some applications in which it is desirable to reduce the amount of time required to complete the measurements and calculations for each sensor. For example, V2 can be measured without driving the signal line for the sensor of interest low, in which case it can be shown that R, the resistance of the sensor of interest, is given by:

$$R = Rp\left(\frac{ADC_{max} - \text{Count}_{V2}}{\text{Count}_{V1}}\right)$$

This requires fewer instructions/operations by the sensor circuitry and may be advantageous for applications using higher sample rates. Other variations of these approaches may be apparent to those of skill in the art.

The detection of forces on a particular implementation of a steering wheel sensor system is described with reference to the flowcharts of FIGS. 9 and 10. As will be appreciated, these processes may be performed, for example, by sensor circuitry (e.g., a processor or controller configured with firmware) as described above with reference to FIG. 2.

The sensors of the array are driven sequentially and the resistance of each is captured via the conversion of each sensor's output voltage by an analog-to-digital converter (e.g., ADC 204). After ADC values have been captured for all of the sensors of the array, an 'update' flag is set. Within the system's main execution cycle (which occurs in the neighborhood of 55 times per second in one class of implementations), this flag is polled to determine when a new "frame" of data (i.e., a new set of values representing all of the sensors of the array) is ready for analysis. When the flag is set, the system checks for "grip events" using adjusted thresholding (e.g., as illustrated in FIG. 9), and for "swipe events" using delta thresholding (e.g., as illustrated in FIG. 10).

Figure 9:
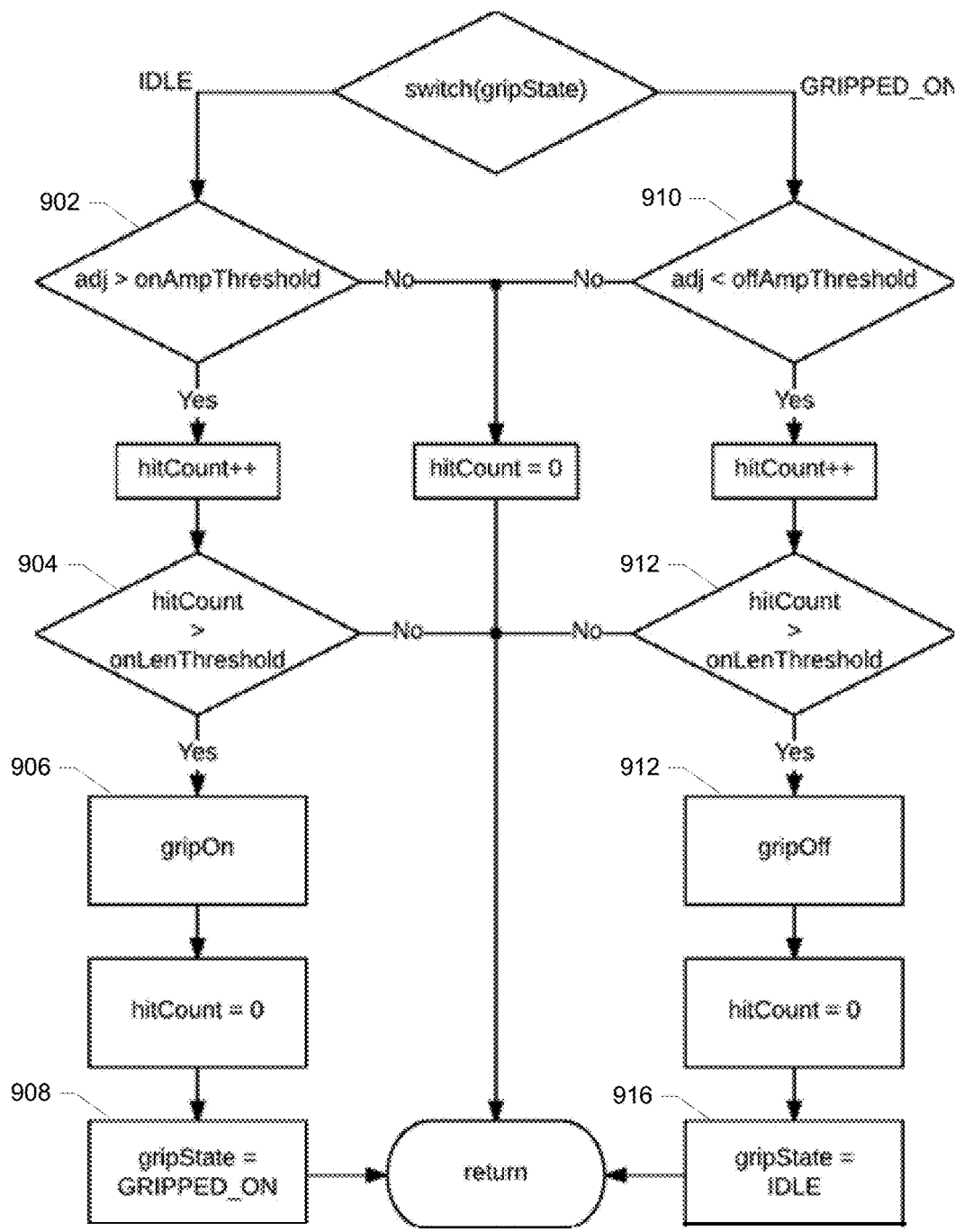
FIGS. 9 and 10 are flowcharts illustrating aspects of the operation of a steering wheel sensor system according to particular implementations.

FIG. 9 illustrates the process of determining whether a grip event has occurred for one sensor. The depicted process is performed for each sensor during each execution cycle (triggered by the flag being set). The process shows two paths, one in which a grip event for the sensor has not yet been detected (i.e., the sensor's state is "IDLE"), and one in which a grip event for the sensor has already been detected (i.e., the sensor's state is "GRIPPED_ON").

As described above, due to variations in the sensors, each sensor has calibration data (in this example an offset associated with its base resistance) that is used to adjust the raw ADC values to arrive at an adjusted ADC reading for each sensor (i.e., "adj"). This offset-adjusted value is substantially proportional to applied force; with no applied force yielding an offset adjusted value of approximately 0 ADC counts (i.e., "hitcount"). To recognize sustained force, i.e., a "grip event," this offset-adjusted value is monitored using a finite state machine (FSR) and four thresholds as represented in FIG. 9. These thresholds correspond to "on" and "off" levels for the amplitude of the ADC output representing the magnitude of applied force (i.e., "onAmpThreshold" and "offAmpThreshold"), and "on" and "off" levels for the number of ADC samples representing the duration of applied force (i.e., "onLenThreshold" and "offLenThreshold"). If the offset-adjusted ADC value for a sensor in the "IDLE" state is above the "on" amplitude threshold (902) for a number of samples greater than the "on" length threshold (904), a "gripOn" message is generated (906) and that sensor advances to the "GRIPPED_ON" state (908). Conversely, if the offset-adjusted ADC value for a sensor in the "GRIPPED_ON" state drops below the "off" amplitude threshold (910) for a number of samples greater than the "off" length threshold (912), a "gripOff" message is generated (914) and the sensor returns to the "IDLE" state (916). This process is performed for each sensor during each execution cycle to detect events in which sustained force is applied.

Figure 10:
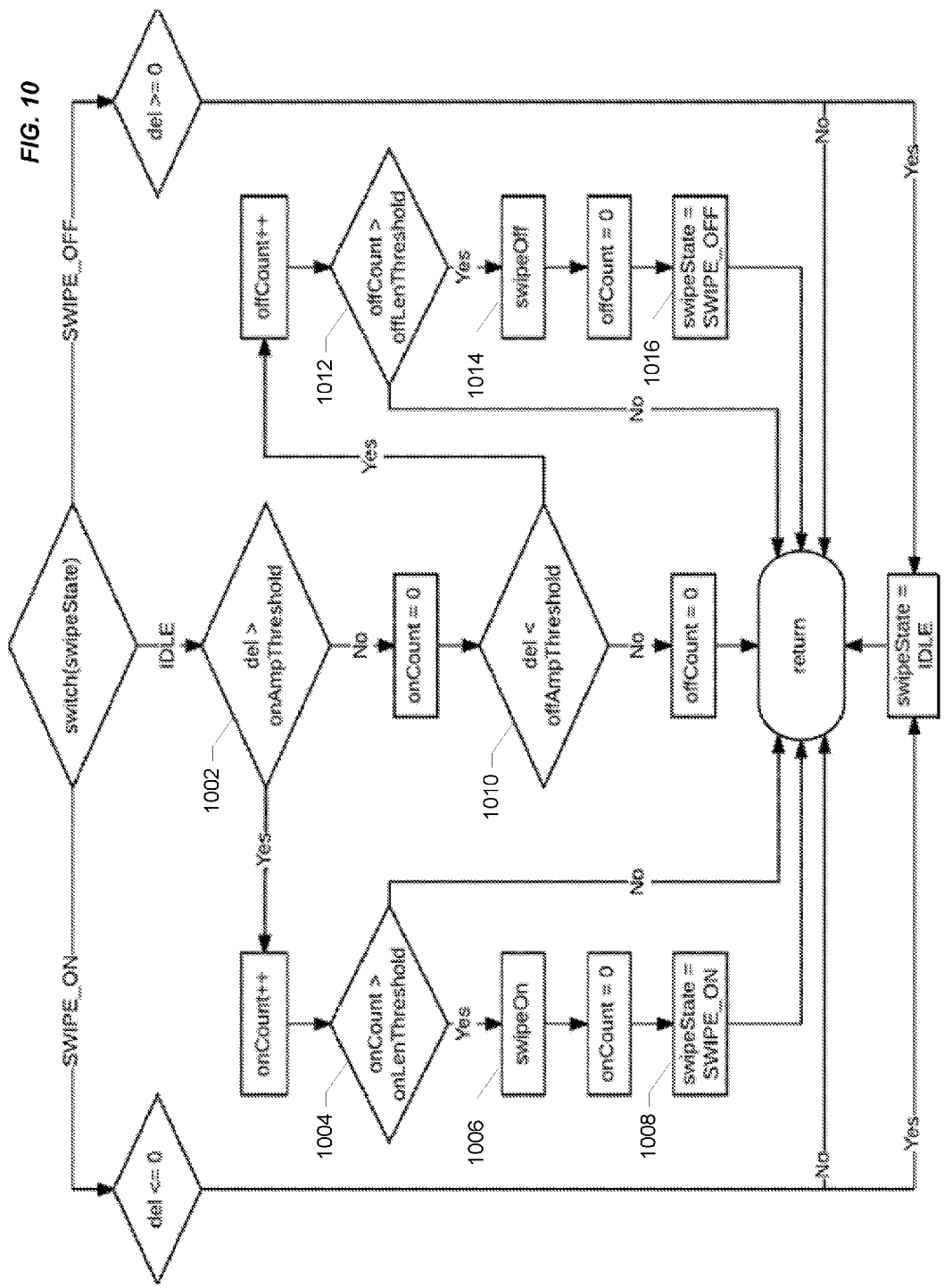

FIG. 10 illustrates the process of determining whether a swipe event has occurred for one sensor. As with the process illustrated in FIG. 9, the process depicted in FIG. 10 is performed for each sensor during each execution cycle. The process shows three paths, one in which a swipe event for the sensor has not yet been detected (i.e., the sensor's state is "IDLE"), one in which a swipe event for the sensor has been detected (i.e., the sensor's state is "SWIPE_ON"), and a third in which a swipe event has terminated (i.e., the sensor's state is "SWIPE_OFF"). A swipe event is detected if a sequence of adjacent sensors are activated in a particular order and/or direction.

To recognize quick changes in force as when a finger moves quickly across a sensors, i.e., a "swipe event," the change or delta in force (i.e., "del") is monitored. The delta value is not an instantaneous delta, but rather a sum of the differences between the past several samples. The number of samples used is programmable and may be adjusted to suit a particular application and execution cycle. According to a particular class of implementations in which the execution cycle was about 55 cycles per second, about eight samples was found to be an effective number. A circular buffer of n deltas between adjacent samples is maintained and, after each new sample, the delta buffer is summed. This can be summarized by the following equation:

$$\text{del} = \sum_{i=0}^{n-1} \Delta ADC_i = \sum_{i=0}^{n} (ADC_{i+1} - ADC_i) = ADC_{n-1} - ADC_0$$

Swipes are detected using a finite state machine, similar to that used for grip detection, with its own set of thresholds. Each sensor remains in the "IDLE" state unless perturbed (similar to the grip detection state machine) but may advance to one of two states depending upon the sign of the change in force. If the change in force for a sensor is positive and greater than the "on" amplitude threshold (i.e., "onAmpThreshold") (1002) for a number of samples (i.e., "onCount") greater than the "on" length threshold (i.e., "onLenThreshold") (1004), a "swipeOn" message is generated (1006) and the sensor advances to the "SWIPE_ON" state (1008) until the force stabilizes or reverses sign. In the opposite case where the change in force is negative and greater in magnitude than the "off" amplitude threshold (i.e., "offAmpThreshold") (1010) for a number of samples (i.e., "offCount") greater than the "off" length threshold (i.e., "offLenThreshold") (1012), a "swipeOff" message is generated (1014) and the sensor advances to the "SWIPE_OFF" state (1016). The state machine remains in either of these swiped states until the force stabilizes ("del" equal to zero) or changes sign. At that point the state of the sensor returns to "IDLE" and the system monitors the sensor for further changes in force. In this way, an event can be detected in which a driver moves a finger around the circumference of the steering wheel. It should be noted that although the variables onAmpThreshold, offAmpThreshold, onLenThreshold, and offLenThreshold in FIGS. 9 and 10 share the same names, the values are likely to be different for the different algorithms.

The detection of grip and swipe events can support recognition of a variety of gestures that can be mapped to various control functions. Examples of gestures include, but are not limited to, single and double grips, swipes (clockwise and counter-clockwise), driver presence, etc. For example, grip event detection can support recognition of single and double grip gestures that can be analogized to single and double-clicks of a computer mouse and mapped to a similarly broad range of control functions, e.g., such gestures could be mapped to commands to answer a phone call, turn an audio system on or off, interact with a navigation system, etc. In another example, grip event detection can support recognition of the presence of a driver's hands on the steering wheel, and can be detected at any point (or multiple points) around the circumference of the steering wheel.

Each sensor's offset stored by the sensor circuitry may change over time due to factors including changes in temperature and gradual compression or decompression of the piezoresistive material. Therefore, according to some implementations, the offset for each sensor is repeatedly recalculated over time to account for this variation. According to a particular implementation, the sensors are sequentially scanned and evaluated on a regular basis to determine whether they are eligible for offset recalculation. Several criteria must be met for offset recalculation to occur: (1) the sensor being evaluated must not be depressed (e.g., its state must be "IDLE"); (2) sufficient time must have passed since the sensor being evaluated was last released; (3) other sensors sharing a drive line with the sensor being evaluated must all be released, or, if sensor(s) on the same drive line are pressed, the sensor being evaluated must be within an acceptable range for offset recalculation to occur.

If the sensor in question is pressed (e.g., as determined by the grip detection algorithm), offset recalculation is not performed because the current ADC value reflects the resistance of the sensor with force applied, rather than the "IDLE" state of the sensor. A "hold-off" timer ensures that a sensor is given sufficient time to return to a relaxed physical state. Upon the release of a sensor, the hold-off timer is refilled and then decremented with each subsequent scan of the sensor. If the sensor is not depressed again prior to the hold-off timer's expiration, the sensor offset is recalculated.

If one or more sensors sharing a drive line are sufficiently depressed, their resistance will be low enough to draw more current than the drive lines can readily supply. This will lead to driveline "drooping" as the voltage seen at the driveline node is lowered by the current draw. As a result, the raw ADC output for untouched sensors sharing that driveline may rise. If an untouched sensor's offset is recalculated at that time, when the other sensors are released the untouched sensor's raw ADC output will drop and the offset-adjusted ADC output will rise. The offset-adjusted ADC output could potentially rise above the on amplitude threshold, causing a false trigger and a stuck sensor.

If a sensor sharing a driveline with pressed sensors is itself untouched, gradual changes in environmental factors and relaxation of sensor fabric can affect the sensor offset and may be accounted for. In the case that a sensor's raw ADC output decreases below the offset, if this change is less than the "on" amplitude threshold for a grip, that sensor's offset is recalculated. This prevents the scenario described above while still accounting for offset deviation in the other direction.

When the criteria for a given sensor are met, the sensor's current raw ADC output is factored into its current offset using an infinite-impulse response (IIR) filter. This allows the offset to gradually approach its new value while suppressing momentary jumps in ADC output.

As will be appreciated, the range of applications of sensor systems enabled by the present disclosure is quite broad. For example, a steering wheel sensor system could be used for vehicle safety applications, e.g., to ensure that the driver has at least one hand on the wheel. Such a system might issue a warning when it determines that the driver is not touching the wheel or gripping the wheel with sufficient force while the vehicle is running and/or in motion. A more sophisticated use of the data from a steering wheel sensor system enabled by the present disclosure might track variations in grip strength and/or location to detect driver fatigue; a significant factor in many highway accidents in the trucking and transportation industries.

Steering wheel sensor systems might also be useful with self-driving vehicles. For example, in addition to determining that the driver is not touching the wheel or that the driver is fatigued as described above, this information might be used to initiate control of the vehicle by the driverless control system. Control of a vehicle might also be switched from a driverless control system to the vehicle's occupant in response to the steering wheel system sensing that the occupant has grabbed the steering wheel.

Other vehicle systems might be controlled using a steering wheel sensor system. For example, navigation, entertainment, communications, cruise control, or environmental systems of a vehicle could be controlled without requiring the driver to remove her hands from the steering wheel (thus maintaining the driver's focus and improving safety). In one example, a double squeeze of the steering wheel might answer a call on a Bluetooth-connected smart phone, or allow a voice command to be acted upon. Sliding the hand along the circumference of the steering wheel could be used to adjust the volume of the vehicle's entertainment system or the temperature of the interior of the vehicle.

In another example, driver hand location determined using a steering wheel sensor system might be used to control airbag deployment to reduce airbag injuries. In another example, a steering wheel sensor system might generate statistical information over time about driving habits; information that could be used by a driver to improve things like hand positioning, wheel turning technique, etc. Such information might also be linked or provided to habit tracking applications that employ global positioning system (GPS) technology to develop an understanding of driver behavior based on location and/or time. In another example, steering wheel sensor systems could be used in driving simulators and real vehicles for driver training.

As will be appreciated from the diversity of the foregoing examples, the range of applications for steering wheel sensor systems enabled by the present disclosure is quite broad and diverse.

It will be understood by those skilled in the art that changes in the form and details of the implementations described herein may be made without departing from the scope of this disclosure. For example, implementations have been described herein in which conductive traces are formed directly on or otherwise integrated with a flexible piezoresistive substrate to form various types of sensor systems. However, the scope of this disclosure is not so limited. That is, it should be noted that implementations are contemplated in which some or even all of the conductive traces of a sensor system enabled by the present disclosure may not be formed directly on a flexible piezoresistive substrate, but instead are formed on another substrate that is placed in contact with a piezoresistive substrate. For example, as described above, the conductive traces forming a sensor array may be formed on a non-conductive or low conductivity substrate (e.g., a fabric or rubber with dielectric properties) which is placed in contact with a flexible piezoresistive substrate in a multi-layer structure such that the conductive traces are in contact with the piezoresistive substrate. As will be appreciated by those of skill in the art, such an arrangement may function in a manner similar to sensor systems in which the conductive traces are formed directly on the piezoresistive substrate. As will also be appreciated various functionalities described herein in the context of one configuration of a piezoresistive sensor system may be readily applied to other configurations.

More generally, functionalities that have been described herein with reference to arrays of piezoresistive sensors may be applicable to sensor systems based on other types of force-sensing technology. Such functionalities include, for example, techniques for detecting grip events and swipe events, and techniques for recalculating sensor offsets or other types of sensor calibration data.

In another example, implementations have been described herein in which sensor arrays are configured along a strip that runs lengthwise along the circumference of the steering wheel with the width of the strip being wrapped around the steering wheel. However, implementations are also contemplated in which such a strip is wrapped around the steering wheel diagonally in a spiraling fashion.

In view of the diversity of variations contemplated by the inventors, the scope of the present disclosure should not be limited by reference to the details of specific examples described herein.

Finally, although various advantages and aspects may have been described with reference to particular implementations, the scope of this disclosure should not be limited by reference to such advantages and aspects.

What is claimed is:

1. A sensor system for use with a steering wheel, comprising:
   a flexible dielectric substrate;
   flexible piezoresistive material in contact with the flexible dielectric substrate;
   an array of sensors, each sensor comprising at least two conductive traces formed on the flexible dielectric substrate and in contact with a corresponding portion of the flexible piezoresistive material; and
   sensor circuitry configured to selectively energize the sensors, and to receive sensor signals from the array of sensors, each sensor signal representing a force associated with a corresponding one of the sensors;
   wherein the flexible dielectric substrate, the piezoresistive material, and the array of sensors are configured for wrapping around the steering wheel such that the array of sensors conforms to a portion of a circumference of the steering wheel.

2. The sensor system of claim 1, wherein the piezoresistive material is continuous and substantially conforms to a shape of the array of sensors.

3. The sensor system of claim 1, wherein the piezoresistive material comprises a plurality of patches, each of the patches substantially conforming to a shape of one or more of the sensors.

4. The sensor system of claim 1, wherein different sensors in the array of sensors have different dimensions that correspond to variations in contours of the steering wheel.

5. The sensor system of claim 1, wherein each of the sensors has calibration data associated therewith, the sensor circuitry being further configured to adjust each of the sensor signals with the calibration data for the corresponding sensor, thereby substantially normalizing force data derived from the sensor signals.

6. The sensor system of claim 5, wherein the sensor circuitry is further configured to repeatedly recalculate the calibration data for each of the sensors after the sensor system is integrated with the steering wheel.

7. The sensor system of claim 1, wherein the sensor circuitry is further configured to detect a grip event associated with consecutively arranged sensors of the sensor array by determining that a force associated with each of the consecutively arranged sensors exceeds a threshold for a specified duration.

8. The sensor system of claim 1, wherein the sensor circuitry is further configured to detect a swipe event associated with consecutively arranged sensors of the sensor array by determining that a positive change in force associated with each of the consecutively arranged sensors exceeds a first threshold for a first specified duration, and a negative change in force associated with each of the consecutively arranged sensors exceeds a second threshold for a second specified duration.

9. The sensor system of claim 1, wherein the sensor circuitry is configured to generate control information from the sensor signals, the control information being for use by a vehicle safety control system, a driverless vehicle control system, a vehicle braking control system, a vehicle cruise control system, a vehicle entertainment system, a vehicle navigation system, a vehicle communication system, or a vehicle environmental system.

10. The sensor system of claim 1, wherein the flexible dielectric substrate includes relief cutouts that allow the array of sensors to conform to the portion of the circumference of the steering wheel.

11. The sensor system of claim 1, wherein the steering wheel has a heating system associated therewith, the heating system having an electrical ground, the sensor system further comprising a ground connection configured for connection to the electrical ground of the heating system when the sensor system is integrated with the steering wheel.

12. A sensor system for use with a steering wheel, comprising:
a flexible piezoresistive substrate;
an array of sensors, each sensor comprising at least two conductive traces formed on a corresponding portion of the flexible piezoresistive substrate; and
sensor circuitry configured to selectively energize the sensors, and to receive sensor signals from the array of sensors, each sensor signal representing a force associated with a corresponding one of the sensors;
wherein the flexible piezoresistive substrate and the array of sensors are configured for wrapping around the steering wheel such that the array of sensors conforms to a portion of a circumference of the steering wheel.

13. The sensor system of claim 12, wherein different sensors in the array of sensors have different dimensions that correspond to variations in contours of the steering wheel.

14. The sensor system of claim 12, wherein each of the sensors has calibration data associated therewith, the sensor circuitry being further configured to adjust each of the sensor signals with the calibration data for the corresponding sensor, thereby substantially normalizing force data derived from the sensor signals.

15. The sensor system of claim 14, wherein the sensor circuitry is further configured to repeatedly recalculate the calibration data for each of the sensors after the sensor system is integrated with the steering wheel.

16. The sensor system of claim 12, wherein the sensor circuitry is further configured to detect a grip event associated with consecutively arranged sensors of the sensor array by determining that a force associated with each of the consecutively arranged sensors exceeds a threshold for a specified duration.

17. The sensor system of claim 12, wherein the sensor circuitry is further configured to detect a swipe event associated with consecutively arranged sensors of the sensor array by determining that a positive change in force associated with each of the consecutively arranged sensors exceeds a first threshold for a first specified duration, and a negative change in force associated with each of the consecutively arranged sensors exceeds a second threshold for a second specified duration.

18. The sensor system of claim 12, wherein the sensor circuitry is configured to generate control information from the sensor signals, the control information being for use by a vehicle safety control system, a driverless vehicle control system, a vehicle braking control system, a vehicle cruise control system, a vehicle entertainment system, a vehicle navigation system, a vehicle communication system, or a vehicle environmental system.

19. A sensor system for use with a steering wheel, comprising:
an array of sensors configured for integration with the steering wheel such that the array of sensors conforms to a portion of a circumference of the steering wheel; and
sensor circuitry configured to selectively energize the sensors, and to receive sensor signals from the array of sensors, each sensor signal representing a force associated with a corresponding one of the sensors, the sensor circuitry being further configured to adjust each of the sensor signals with calibration data for the corresponding sensor, thereby substantially normalizing force data derived from the sensor signals, the sensor circuitry being further configured to recalculate the calibration data for each of the sensors after the sensor system is integrated with the steering wheel.

20. The sensor system of claim 19, wherein the sensor circuitry is configured to initially calculate at least a portion of the calibration data each time the sensor system is powered on.

21. The sensor system of claim 20, wherein the sensor circuitry is configured to determine that a force is being exerted on a first sensor when the sensor system is powered on, and to use previously stored calibration data for the first sensor.

22. The sensor system of claim 19, wherein the sensor circuitry is configured to retrieve previously stored calibration data each time the sensor system is powered on.

23. The sensor system of claim 19, wherein the sensor circuitry is configured to recalculate the calibration data for each of the sensors by:
determining that no force is being exerted on the sensor;
determining that no force has been exerted on the sensor for a specified duration; and
determining that no force is being exerted on another sensor with which the sensor shares a signal line.

24. The sensor system of claim 19, wherein the sensor circuitry is configured to recalculate the calibration data for each of the sensors by factoring new calibration data for the sensor into current calibration data for the sensor using an infinite-impulse response filter.

25. A sensor system for use with a steering wheel, comprising:
- an array of sensors configured for integration with the steering wheel such that the array of sensors conforms to a portion of a circumference of the steering wheel; and
- sensor circuitry configured to receive sensor signals from the array of sensors, each sensor signal representing a force associated with a corresponding one of the sensors, the sensor circuitry being further configured to detect a grip event associated with first consecutively arranged sensors of the sensor array by determining that a force associated with each of the first consecutively arranged sensors exceeds a first threshold for a first specified duration, the first sensor circuitry being further configured to detect a swipe event associated with second consecutively arranged sensors of the sensor array by determining that a positive change in force associated with each of the second consecutively arranged sensors exceeds a second threshold for a second specified duration, and a negative change in force associated with each of the second consecutively arranged sensors exceeds a third threshold for a third specified duration.

26. The sensor system of claim 25, further comprising:
- a flexible dielectric substrate on which the sensors of the array of sensors are formed; and
- flexible piezoresistive material in contact with the flexible dielectric substrate and the sensors;
- wherein the flexible dielectric substrate, the piezoresistive material, and the array of sensors are configured for wrapping around the steering wheel such that the array of sensors conforms to the portion of the circumference of the steering wheel.

27. The sensor system of claim 26, wherein the piezoresistive material is continuous and substantially conforms to a shape of the array of sensors.

28. The sensor system of claim 26, wherein the piezoresistive material comprises a plurality of patches, each of the patches substantially conforming to a shape of one or more of the sensors.

29. The sensor system of claim 25, further comprising a flexible piezoresistive substrate on which the sensors of the array of sensors are formed, wherein the flexible piezoresistive substrate and the array of sensors are configured for wrapping around the steering wheel such that the array of sensors conforms to the portion of the circumference of the steering wheel.

30. The sensor system of claim 25, wherein each of the sensors has calibration data associated therewith, the sensor circuitry being further configured to adjust each of the sensor signals with the calibration data for the corresponding sensor, thereby substantially normalizing force data derived from the sensor signals, wherein the sensor circuitry is further configured to recalculate the calibration data for each of the sensors after the sensor system is integrated with the steering wheel.

31. The sensor system of claim 25, wherein the sensor circuitry is further configured to detect a grip event associated with consecutively arranged sensors of the sensor array by determining that a force associated with each of the consecutively arranged sensors exceeds a threshold for a specified duration.

32. The sensor system of claim 25, wherein the sensor circuitry is further configured to detect a swipe event associated with consecutively arranged sensors of the sensor array by determining that a positive change in force associated with each of the consecutively arranged sensors exceeds a first threshold for a first specified duration, and a negative change in force associated with each of the consecutively arranged sensors exceeds a second threshold for a second specified duration.

33. The sensor system of claim 25, wherein the sensor circuitry is configured to generate control information from the sensor signals, the control information being for use by a vehicle safety control system, a driverless vehicle control system, a vehicle braking control system, a vehicle cruise control system, a vehicle entertainment system, a vehicle navigation system, a vehicle communication system, or a vehicle environmental system.

* * * * *